(12) United States Patent
Brockmann et al.

(10) Patent No.: US 10,491,930 B2
(45) Date of Patent: *Nov. 26, 2019

(54) INTELLIGENT MULTIPLEXING USING CLASS-BASED, MULTI-DIMENSIONED DECISION LOGIC FOR MANAGED NETWORKS

(71) Applicant: ACTIVEVIDEO NETWORKS, INC., San Jose, CA (US)

(72) Inventors: Ronald A. Brockmann, Los Gatos, CA (US); Maarten Hoeben, Amersfoort (NL); Onne Gorter, Hilversum (NL); Gerrit Hiddink, Amersfoort (NL)

(73) Assignee: ACTIVEVIDEO NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,430

(22) Filed: Oct. 9, 2017

(65) Prior Publication Data

US 2018/0131973 A1 May 10, 2018

Related U.S. Application Data

(63) Continuation of application No. 14/696,462, filed on Apr. 26, 2015, now Pat. No. 9,788,029.

(Continued)

(51) Int. Cl.
*H04J 3/02* (2006.01)
*H04N 21/2385* (2011.01)
(Continued)

(52) U.S. Cl.
CPC ..... *H04N 21/2385* (2013.01); *H04L 41/0893* (2013.01); *H04L 41/0896* (2013.01);
(Continued)

(58) Field of Classification Search
CPC .. H04N 21/2402; H04L 41/0896; H04L 47/24
See application file for complete search history.

(56) References Cited

U.S. PATENT DOCUMENTS 5,623,490 A * 4/1997 Richter ............... H04L 12/1818
348/E7.081
5,642,498 A 6/1997 Kutner
(Continued)

FOREIGN PATENT DOCUMENTS

EP 2271098 A1 1/2011
EP 2357555 A1 8/2011
(Continued)

OTHER PUBLICATIONS

ActiveVideo Networks, Inc., Decision to grant an European Patent, EP12767642.7, dated May 11, 2017, 2 pgs.
(Continued)

*Primary Examiner* — Bo Hui A Zhu
(74) *Attorney, Agent, or Firm* — Morgan, Lewis & Bockius LLP

(57) ABSTRACT

A server system assigns a group of user sessions to a single modulator. The user sessions comprise data in a plurality of classes, each class having a respective priority. The plurality of classes includes, in order of priority from highest priority to lowest priority, audio data, video data, and user-interface graphical elements. The server system determines that an aggregate bandwidth for a first frame time exceeds a specified budget for the modulator. In response to determining that the aggregate bandwidth for the first frame time exceeds the specified budget, the server system transmits an allocated portion of the data for the group of user sessions through the modulator onto a channel corresponding to the modulator during the first frame time in accordance with the class priorities.

20 Claims, 16 Drawing Sheets

Related U.S. Application Data

(60) Provisional application No. 61/984,697, filed on Apr. 25, 2014.

(51) Int. Cl.

| | | |
|---|---|---|
| *H04L 12/24* | (2006.01) | |
| *H04L 12/873* | (2013.01) | |
| *H04N 21/2365* | (2011.01) | |
| *H04N 21/24* | (2011.01) | |
| *H04N 21/236* | (2011.01) | |
| *H04N 21/2368* | (2011.01) | |
| *H04N 21/2381* | (2011.01) | |
| *H04N 21/61* | (2011.01) | |
| *H04N 21/647* | (2011.01) | |
| *H04L 12/851* | (2013.01) | |

(52) U.S. Cl.
CPC ....... *H04L 47/521* (2013.01); *H04N 21/2365* (2013.01); *H04N 21/2368* (2013.01); *H04N 21/2381* (2013.01); *H04N 21/23614* (2013.01); *H04N 21/23655* (2013.01); *H04N 21/2402* (2013.01); *H04N 21/6118* (2013.01); *H04N 21/6125* (2013.01); *H04N 21/64792* (2013.01); *H04L 47/24* (2013.01)

(56) References Cited

U.S. PATENT DOCUMENTS

| | | | |
|---|---|---|---|
| 6,055,247 | A | 4/2000 | Kubota et al. |
| 6,310,601 | B1 | 10/2001 | Moore et al. |
| 6,539,545 | B1 | 3/2003 | Dureau et al. |
| 6,850,490 | B1 | 2/2005 | Woo et al. |
| 7,925,775 | B2 | 4/2011 | Nishida |
| 8,839,317 | B1 | 9/2014 | Rieger et al. |
| 8,914,813 | B1 | 12/2014 | Sigurdsson et al. |
| 9,226,018 | B1 | 12/2015 | Filippov et al. |
| 9,621,926 | B1 | 4/2017 | Lee et al. |
| 9,635,440 | B2 | 4/2017 | Lacroix |
| 2001/0027563 | A1 | 10/2001 | White et al. |
| 2002/0116705 | A1 | 8/2002 | Perlman et al. |
| 2002/0178278 | A1 | 11/2002 | Ducharme |
| 2003/0210209 | A1* | 11/2003 | Lagarrigue .......... H04N 7/0806 345/1.3 |
| 2003/0217360 | A1 | 11/2003 | Gordon et al. |
| 2004/0111526 | A1 | 6/2004 | Baldwin et al. |
| 2004/0151385 | A1 | 8/2004 | Oneda et al. |
| 2004/0216045 | A1 | 10/2004 | Martin et al. |
| 2005/0034155 | A1 | 2/2005 | Gordon et al. |
| 2005/0232309 | A1 | 10/2005 | Kavaler |
| 2006/0174021 | A1 | 8/2006 | Osborne et al. |
| 2006/0174026 | A1 | 8/2006 | Robinson et al. |
| 2006/0184614 | A1 | 8/2006 | Baratto et al. |
| 2006/0267995 | A1 | 11/2006 | Radloff |
| 2007/0043667 | A1 | 2/2007 | Qawami et al. |
| 2007/0266412 | A1 | 11/2007 | Trowbridge et al. |
| 2008/0046373 | A1 | 2/2008 | Kim |
| 2008/0098212 | A1 | 4/2008 | Helms et al. |
| 2008/0109556 | A1 | 5/2008 | Karlberg |
| 2008/0172441 | A1 | 7/2008 | Speicher et al. |
| 2008/0232243 | A1 | 9/2008 | Oren |
| 2008/0243998 | A1 | 10/2008 | Oh et al. |
| 2008/0244681 | A1 | 10/2008 | Gossweiler et al. |
| 2009/0172431 | A1 | 7/2009 | Gupta et al. |
| 2009/0172726 | A1 | 7/2009 | Vantalon |
| 2009/0183197 | A1 | 7/2009 | Matthews |
| 2009/0265746 | A1 | 10/2009 | Halen et al. |
| 2009/0316709 | A1 | 12/2009 | Polcha |
| 2010/0054268 | A1 | 3/2010 | Divivier |
| 2010/0131411 | A1 | 5/2010 | Jogand-Coulomb et al. |
| 2010/0153885 | A1 | 6/2010 | Yates |
| 2010/0158109 | A1 | 6/2010 | Dahlby |
| 2011/0150102 | A1* | 6/2011 | Gilson .......... H04N 21/234327 375/240.27 |
| 2011/0161517 | A1 | 6/2011 | Ferguson |
| 2011/0173590 | A1 | 7/2011 | Yanes |
| 2011/0202948 | A1 | 8/2011 | Bildgen et al. |
| 2011/0211591 | A1 | 9/2011 | Traub et al. |
| 2011/0261889 | A1 | 10/2011 | Francisco |
| 2011/0283304 | A1 | 11/2011 | Roberts |
| 2012/0224641 | A1 | 9/2012 | Haberman et al. |
| 2012/0271920 | A1 | 10/2012 | Isaksson |
| 2012/0297081 | A1 | 11/2012 | Karlsson et al. |
| 2013/0042271 | A1 | 2/2013 | Yellin |
| 2013/0254675 | A1 | 9/2013 | de Andrade et al. |
| 2013/0276015 | A1 | 10/2013 | Rothschild |
| 2013/0283318 | A1 | 10/2013 | Wannamaker |
| 2013/0297887 | A1 | 11/2013 | Woodward |
| 2014/0089469 | A1 | 3/2014 | Ramamurthy et al. |
| 2014/0123169 | A1 | 5/2014 | Koukarine et al. |
| 2014/0157298 | A1 | 6/2014 | Murphy |
| 2014/0168515 | A1 | 6/2014 | Sagliocco |
| 2014/0269930 | A1 | 9/2014 | Robinson et al. |
| 2015/0023372 | A1 | 1/2015 | Boatright |
| 2015/0037011 | A1 | 2/2015 | Hubner et al. |
| 2015/0103880 | A1 | 4/2015 | Diard |
| 2015/0135209 | A1 | 5/2015 | LaBosco |
| 2015/0139603 | A1 | 5/2015 | Silverstein et al. |
| 2016/0050069 | A1 | 2/2016 | Griffin et al. |
| 2016/0119624 | A1 | 4/2016 | Frishman |
| 2016/0142468 | A1 | 5/2016 | Song et al. |
| 2016/0357583 | A1 | 12/2016 | Decker et al. |
| 2017/0078721 | A1 | 3/2017 | Brockmann et al. |

FOREIGN PATENT DOCUMENTS

| | | | |
|---|---|---|---|
| GB | 2479164 | A | 10/2011 |
| WO | WO01/56293 | A1 | 8/2001 |
| WO | WO2013/184604 | A1 | 12/2013 |

OTHER PUBLICATIONS

ActiveVideo Networks, Inc., Decision to Grant an European Patent, EP06772771.9, dated Oct. 26, 2017, 2 pgs.
ActiveVideo Networks, Inc., Intention to Grant European Patent, EP06772771.9, dated Jun. 12, 2017, 2 pgs.
ActiveVideo Networks, Inc. Certficate of Grant, EP06772771.9, dated Nov. 22, 2017, 1 pg.
ActiveVideo Networks, Inc. Decision to grant an European Patent, EP11833486.1, dated Oct. 26, 2017, 2 pgs.
ActiveVideo Networks, Inc. Certificate of Grant, EP11833486.1, dated Nov. 22, 2017, 1 pg.
ActiveVideo Networks, Inc. Transmission of Certificate of Grant, EP12767642-7, dated Jun. 7, 2017, 1 pg.
ActiveVideo Networks, Inc. Certificate of Grant, EP12767642-7, dated Jun. 7, 2017, 1 pg.
ActiveVideo Networks, Inc. Intention to Grant, EP06772771.9, dated Jun. 12, 2017, 5 pgs.
ActiveVideo Networks, Inc., Communication Pursuant to Article 94(3), EP14722897.7, dated Jul. 19, 2017, 7 pgs.
ActiveVideo Networks, Inc., Communication Pursuant to Article 94(3), EP14740004.8, dated Aug. 24, 2017, 7 pgs.
ActiveVideo Networks, Inc., Communication Pursuant to Article 94(3), EP15721482.6, dated Nov. 20, 2017, 7 pgs.
ActiveVideo Networks, Inc., Communication Pursuant to Rules 161(2) and 162,EP16818840.7, dated Feb. 20, 2018, 3 pgs.
ActiveVideo Networks, Inc., Extended European Search Report, EP15785776.4, dated Aug. 18, 2017, 8 pgs.
ActiveVideo Networks, Inc., Extended European Search Report, EP15873840.1, dated May 18, 2018, 9 pgs.
ActiveVideo Networks, Inc., Communication Pursuant to Rules 70(2) and 70a(2), EP15873840.1, dated Jun. 6, 2018, 1 pg.
ActiveVideo Networks, Inc., Notification of German Patent, DE602012033235.2, dated Jun. 13, 2017, 3 pgs.
ActiveVideo Networks, Inc., International Preliminary Report on Patentability, PCT/US2016/040547, dated Jan. 2, 2018, 5 pgs.
ActiveVideo Networks, Inc., International Search Report and Written Opinion, PCT/US2016/064972, dated Feb. 17, 2017, 9 pgs.

(56) References Cited

OTHER PUBLICATIONS

Brockmann, Office Action, U.S. Appl. No. 12/443,571, dated May 31, 2017, 36 pgs.
Brockmann, Notice of Allowance, U.S. Appl. No. 14/696,462, dated Jul. 21, 2017, 6 pgs.
Brockmann, Office Action, U.S. Appl. No. 14/217,108, dated Aug. 10, 2017, 14 pgs.
Brockmann, Office Action, U.S. Appl. No. 15/139,166, dated Nov. 22, 2017, 9 pgs.
Brockmann, Office Action, U.S. Appl. No. 15/199,503, dated Feb. 7, 2018, 12 pgs.
Brockmann, Office Action, U.S. Appl. No. 15/261,791, dated Feb. 21, 2018, 26 pgs.
Hoeben, Final Office Action, U.S. Appl. No. 14/757,935, dated Feb. 28, 2018, 33 pgs.
Visscher, Office Action, U.S. Appl. No. 15/368,527, dated Feb. 23, 2018, 23 pgs.
ActiveVideo Networks, Inc., Communication Pursuant to Article 94(3), EP15721483.4, Dec. 10, 2018, 5 pgs.
ActiveVideo Networks, Inc., Communication Pursuant to Rules 70(2) and 70a(2), EP16845261.3, Jan. 18, 2019, 1 pg.
ActiveVideo Networks, Inc., Extended European Search Report, EP16818840.7, Nov. 30, 2018, 5 pgs.
ActiveVideo Networks, Inc., International Preliminary Report on Patentability, PCT/US2016/064972, Jun. 14, 2018, 7 pgs.
ActiveVideo Networks, Inc., International Search Report and Written Opinion, PCT/US2017/068293, dated Mar. 19, 2018, 7 pgs.
Brockmann, Office Action, U.S. Appl. No. 15/728,430, dated Jul. 27, 2018, 6 pgs.
Brockmann, Notice of Allowance, U.S. Appl. No. 15/139,166, dated Oct. 10, 2018, 7 pgs.
Brockmann, Office Action, U.S. Appl. No. 15/791,198, dated Dec. 21, 2018, 18 pgs.
Brockmann, Final Office Action, U.S. Appl. No. 15/791,198, dated Apr. 25, 2019, 22 pgs.
Brockmann, Notice of Allowance, U.S. Appl. No. 15/199,503, dated Aug. 16, 2018, 13 pgs.
Brockmann, Notice of Allowance, U.S. Appl. No. 15/199,503, dated Dec. 12, 2018, 9 pgs.
Brockmann, Final Office Action, U.S. Appl. No. 15/261,791, dated Oct. 16, 2018, 17 pgs.
Hoeben, Office Action, U.S. Appl. No. 14/757,935, dated Jun. 28, 2018, 37 pgs.
Hoeben, Office Action, U.S. Appl. No. 15/851,589, dated Sep. 21, 2018, 19 pgs.
Hoeben, Notice of Allowance, U.S. Appl. No. 14/757,935, dated Jan. 28, 2019, 9 pgs.
Ohta et al., "Selective multimedia access protocol for wireless multimedia communication," Communications, Computers and Signal Processing, 1997, 10 Yeas PACRIM 1987-1997—Networking the Pacific Rim. 1997 IEEE Pacific Rim Conference NCE on Victoria, BC, Canada Aug. 20-22, 1997, New York, NY, USA, IEEE, US, vol. 1, Aug. 20, 1997 (Aug. 20, 1997), pp. 81-84, XP010244922, DOI:10.1109/PACRIM.1997.619907, ISBN:978-0-7803-3905-7.
Visscher, Final Office Action, U.S. Appl. No. 15/368,527, Sep. 11, 2018, 25 pgs.
Visscher, Office Action, U.S. Appl. No. 15/368,527, dated Feb. 1, 2019, 29 pgs.

* cited by examiner

INTELLIGENT MULTIPLEXING USING CLASS-BASED, MULTI-DIMENSIONED DECISION LOGIC FOR MANAGED NETWORKS

RELATED APPLICATION

This application is a continuation of U.S. Non-Provisional application Ser. No. 14/696,462, filed Apr. 26, 2015 entitled "Intelligent Multiplexing Using Class-Based, Multi-Dimensioned Decision Logic for Managed Networks," which claims priority to U.S. Provisional Patent Application No. 61/984,697, titled "Intelligent Multiplexing Using Class-Based, Multi-Dimensioned Decision Logic for Managed and Unmanaged Networks," filed Apr. 25, 2014, which are incorporated by reference herein in their entireties.

TECHNICAL FIELD

The present disclosure generally pertains to cable television network technology, and particularly to adaptive and dynamic multiplexing techniques for traffic over various network topologies.

BACKGROUND

The delivery of digital television to the home was launched in earnest in 1995 for both cable television as well as satellite-delivery systems. This new technology enabled multi-channel video program distributors (MVPD) to provide far more television programming using available network bandwidth as compared to what had been possible using analog signals of the same programs. A plurality of digital television signals are combined to fit multiple digital channels into the space of one legacy analog channel via a process called "multiplexing." When television programs were digitally encoded at a fixed bit rate (called Constant Bit Rate or 'CBR'), then the early digital cable TV systems could carry perhaps six to eight digital television programs in the space of a single legacy analog channel (6 MHz for NTSC or 8 MHz for non-NTSC-based systems).

The distribution networks of MVPD systems, whether cable TV or satellite, are known as "managed networks" because the output of a multiplexer is typically of a fixed bit rate. For comparison, the Internet data network is known as an "unmanaged" network, since the public use of the Internet is not regulated by a central controlling mechanism and bandwidth between two points on the network varies unpredictably.

Variable bit rate (VBR) video encoding is more efficient in the use of bandwidth than CBR encoding. VBR also generally delivers a better quality picture for the same average bandwidth. However, VBR is more difficult to manage on a distribution network. Statistical multiplexing is used to address this difficulty.

With the advent of interactive services hosted in a central location, such as a cable TV headend as well as with media originating "in the cloud" and routing over a managed network to a consumer set-top box, the difficulty of managing the VBR session within a multiplexer becomes far more challenging and more prone to adverse interactions among the sessions within a multiplex stream.

Interactive television services provide the viewer with the ability to interact with their television for the purposes of selecting certain television programming, requesting more information about the programming, or responding to offers, among many possible uses. Such services have been used, for example, to provide navigable menu and ordering systems that are used to implement electronic program guides and on-demand and pay-per-view program reservations without the need to call a service provider. These services typically employ an application that is executed on a server located remotely from the viewer. Such servers may be, for example, located at a cable television headend. The output of a software application running on such servers is streamed to the viewer, typically in the form of an audio-visual MPEG Transport Stream. This enables the stream to be displayed on (or using) virtually any client device that has MPEG decoding capabilities, including a "smart" television, television set-top box, game console, and various network-connected consumer electronics devices and mobile devices. The client device enables the user to interact with the remote application by capturing keystrokes and passing these to the software application over a network connection.

An interactive television service combines the properties of managed and unmanaged network topologies. Such services require low delay, perceptually real-time properties typically associated with Real Time Transport Protocol running over User Datagram Protocol (UDP/RTP) high-complexity, proprietary clients. However, in interactive television applications the stream must be received by relatively low-complexity clients using consumer electronics-grade components. Typically, these clients do not have the capability of much more powerful laptop and tablet computers to which the user has grown accustom. Hence, interactive applications hosted on a cable or satellite set-top box are perceived as slow and old-fashioned compared to the contemporary norm. Hosting the application in a central means (e.g., a remote server located at a cable television headend) and providing the picture output to the set-top device mitigates this shortcoming and allow for the delivery of rich, highly interactive applications and services. It also places stronger demands on the distribution network to deliver these services.

A centrally (remotely) hosted interactive television service provides a combination of relatively static image portions representing a Graphical User Interface (graphical UI or GUI) that requires low-latency, artifact-free updates responsive to user input, and other portions that may have video with associated audio that require smooth and uninterrupted play-out. Conventional network distribution systems do not adequately facilitate this combination of data types. For instance, with existing statistical multiplexers for cable or satellite television systems, when large user interface graphics of a particular session need to be sent to a particular client, the many other sessions sharing the same multiplex have no means available (except a drastic reduction in image quality) to scale back the bandwidth requirements of adjacent streams to allow a temporary large data block representing the UI graphics to pass.

With many interactive sessions active within a single multiplex stream, a possibility exists for disruption to video, audio and/or GUI data. The only alternative that conventional systems have is for the conservative allocation of bandwidth which then supports many fewer simultaneous sessions per multiplex stream.

Therefore, it is desirable to provide an improved way for multiplexing interactive program streams.

Additional background information is provided in U.S. patent application Ser. Nos. 12/443,571; 13/438,617; and 14/217,108, all of which are incorporated by reference herein in their entirety.

SUMMARY

Digital television over a managed network such as a cable television system uses constant-bandwidth channels to carry multiple program streams. Multiplexing within a fixed allocation of bandwidth requires a multiplexer controller to manage the allocation of bandwidth among a group of competing program streams or competing sessions. In this manner, an individual program stream or session competes for bandwidth against the remainder of the program streams in the group of program streams. Control logic in the multiplexer controller is used to manage the byte allocation among the program streams so that as few compromises as possible in quality are required, and the necessary compromises are evenly distributed among the group.

On an unmanaged network, such as the Internet, a single program stream (or session) competes for bandwidth with a large number of other unknown streams over which the multiplexer's controller has no control. One of the many advantages of the systems and methods described herein is that a multiplexer controller can control both managed and unmanaged network traffic and utilize a class-based, multi-dimensional control logic that optimizes the interactive user experience for television programming distributed across any type of network.

In some embodiments, a method for prioritizing content classes in multiplexed content streams is performed at a server system. The method includes assigning a group of user sessions to a single modulator. The user sessions include data in a plurality of classes, each class having a respective priority. An aggregate bandwidth of the group of user sessions for a first frame time is computed. It is determined that the aggregate bandwidth for the first frame time exceeds a specified budget for the modulator. In response to determining that the aggregate bandwidth for the first frame time exceeds the specified budget, bandwidth is allocated for the group of user sessions during the first frame time in accordance with the class priorities. Using the modulator, the group of user sessions is multiplexed onto a channel corresponding to the modulator, in accordance with the allocated bandwidth. The multiplexed group of user sessions is transmitted over a managed network.

In some embodiments, a server system includes a plurality of modulators to multiplex respective groups of user sessions onto respective channels for transmission over a managed network, in accordance with allocated bandwidth. The server system also includes one or more processors and memory storing one or more programs configured to be executed by the one or more processors. The one or more programs include instructions for performing the above-described method.

In some embodiments, a non-transitory computer-readable storage medium stores one or more programs configured for execution by one or more processors of a server system that also includes a plurality of modulators to multiplex respective groups of user sessions onto respective channels for transmission over a managed network in accordance with allocated bandwidth. The one or more programs include instructions for performing the above-described method.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Figure 1:
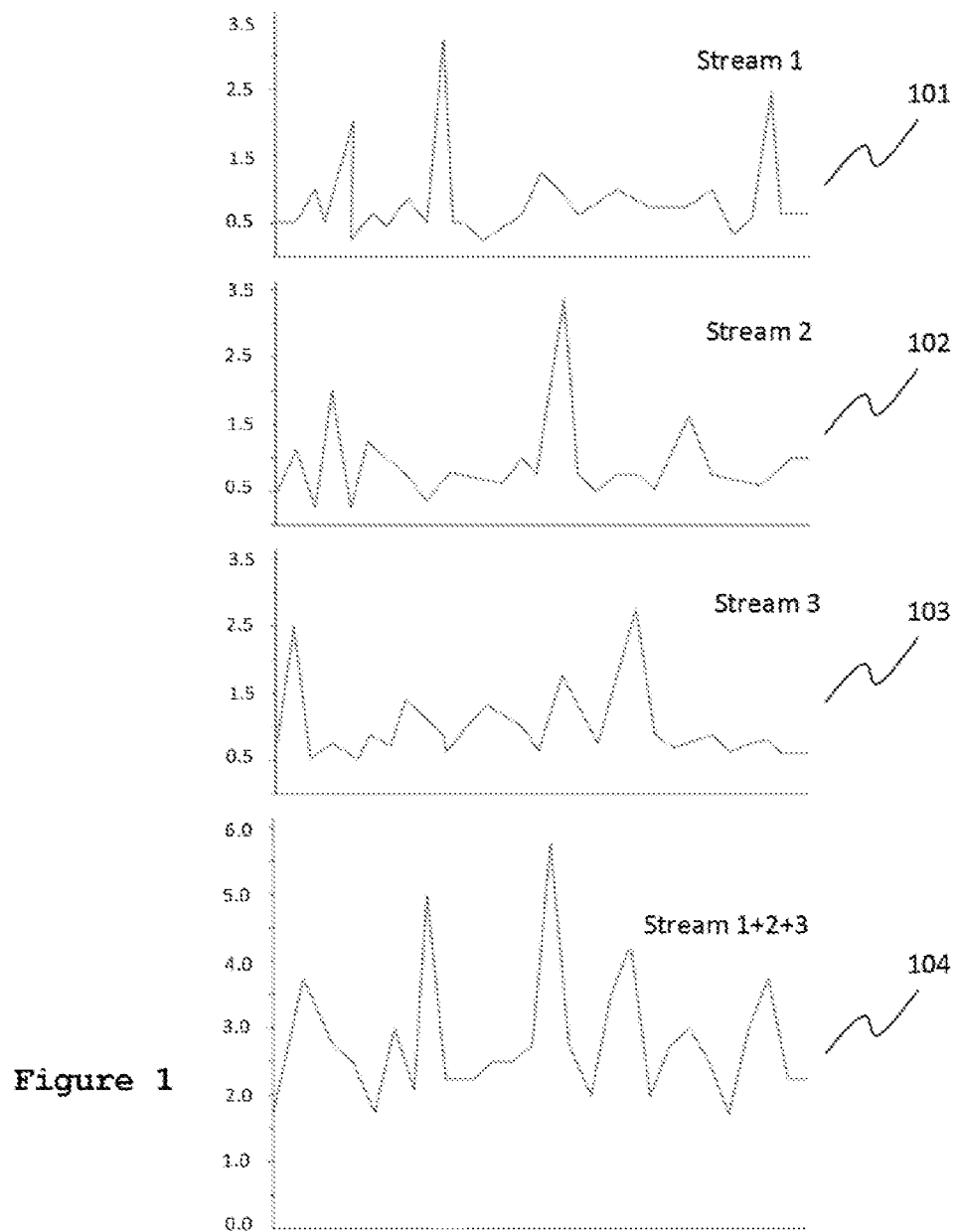
FIG. 1 illustrates a distribution of bandwidth peaks within multiple VBR streams over time and a resulting aggregated bandwidth for a group of signals corresponding to the combined streams, with peaks at typical intervals illustrating the random dispersal of peaks within the group of signals.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The legacy analog television channels of 6 MHz (8 MHz for non-U.S.-based systems) are now largely filled with digital carriers containing many digital TV channels each. More recent cable television distribution networks were designed for broadcast TV, and not interactive television. Hence, there are many obstacles for providing interactive experiences using such legacy distribution networks.

In order to take maximum advantage of the digital bandwidth on a managed network, digital encoding is employed that utilizes a variable-bit-rate (VBR) method to efficiently accommodate differences in video content. For example, a video program might have a prolonged scene with little action and hence have a comparatively low bit rate. When in this same program an action scene arrives, the bit rate will usually increase substantially. VBR encoding can generally follow the action, so to speak, and adjust the resulting bit rate in essentially direct proportion to the demands of the program or service producing the audio-video information: low bit rate for still scenes, slightly more for talking heads and a high bit rate for action. In contrast, conventional systems typically can only employ a Constant Bit Rate (CBR) encoding regime. Hence, the bit rate would have to be high enough to accommodate the maximum requirement of the action scene even though the average bit rate might be less than one-third of the action scene's peak bit rate. Unlike CBR encoding, it is this very difference between peak and average bit rate that can be exploited when employing VBR encoding to maximize the number of television programs that can be combined into a single multiplexed stream.

"Statistical multiplexing" effectively aggregates multiple VBR streams to smooth-out transmission peaks. The peak utilization of the aggregated stream is less than the sum of the peak utilization of the individual streams. In other words, the streams share a certain amount of headroom. "Headroom" represents a bits-per-second amount (e.g., eight megabits-per-second (Mbps)) that is set aside for one or more streams of audio-video-data. As the system employs VBR encoding, a stream that may average 2 Mbps will peak occasionally to perhaps 6 Mbps. So if there is a multiplex of, for example, ten streams, one of the ten may peak at any given time. If it is expected that two of ten might peak simultaneously at any given instant, one allots 8 Mbps to allow the two streams to overshoot by 4 Mbps each. As more streams are multiplexing into a group, less collective overhead is needed because each stream will also drop below the 2 Mbps momentarily and the collective under-utilized bandwidth can contribute to the headroom reserve.

The term "statistical" comes from combining (i.e., multiplexing) digital video streams with the expectation that, on average, not all streams will require maximum headroom at the same time. In fact, MVPD operators specifically group their channels by program type so that not all sports channels are in one multiplex, and the like. Hence, if one can disperse bursty traffic, such as MPEG where scene changes and intra-encoded frames (I-frames) are much larger than the average bit rate of the stream, among the less active program channels, statistical multiplexing can provide a significant gain.

There is a probability, although small, that too many individual streams within a multiplex group experience a peak at the same time. FIG. 1 illustrates a distribution of peaks within multiple VBR streams over time. The bit rates of three example streams 101, 102, and 103 are shown with each having a peak bit rate of approximately 3.5 Mbps. Without statistical multiplexing, 3×3.5=10.5 Mbps would be required for the multiplex group. The fourth stream 104, which corresponds to the multiplex group, shows the aggregated bandwidth of the three individual streams, with a peak bit rate of 6.0 Mbps. Thus, the multiplexing gain is 4.5 Mbps (i.e., 10.5 Mbps−6.0 Mbps). This savings can be used either for better quality for all streams, or for serving more streams in the same amount of bandwidth.

"Intelligent multiplexing" (i-muxing) adds a variety of mitigation techniques to statistical multiplexing when too many peaks would otherwise collide, i.e. when the bandwidth allocated to the aggregate of the streams would be exceeded. For example, screen updates to the user interface for interactive television applications can be deferred to a later frame. This reduces the aggregated bandwidth, but at the cost of increasing the delay before the user sees an expected update to an on-screen menu, for example. This delay is known as latency. In another example, if the screen update for the user interface provides the most information (e.g., the user is expecting a menu to appear), a multiplexer controller with knowledge of this event sequence can decide to not delay the UI screen update and rather drop video frames, which the user may be less likely to notice. Other embodiments vary the picture quality to reduce bandwidth utilization when required by varying the quality of video from external sources, where the quality is reduced by changing encoding parameters in the encoding/transcoding process.

In order to fully exploit these bandwidth allocation means, a class-based prioritization scheme is used. The class basis is established by giving priority to various components of information sent to the client. In some embodiments, the classes are as below; listed in order of priority, from highest priority to lowest priority:
1. Transport Control Information (for example, the MPEG Transport Stream), as this component carries the critical access control and timing information;
2. Audio, as humans notice and react badly to interrupted audio much more than to glitches in video, possibly because our ears do not blink the way our eyes do;

3. Video, such that video frames are dropped to open room for more critical data rather than reduce picture quality, in a process that is often unnoticeable;
4. User interface elements, as the graphical elements of a user interface can be delayed to avoid too many video frames being dropped, thus adding latency to the interface which is rarely noticed; and
5. Error correction information used to "repaint" parts of the video image to mitigate error build-up, which is lowest in priority since its contribution to the user experience is subtle and often subliminal.

In some embodiments, the system provides a "holistic" approach to mitigating problems in one layer (e.g., a layer of the OSI model) by changing behavior of another layer. For example, if the system (e.g., a server located at a cable television headend) detects bandwidth constraints on the data link layer, it mitigates this by manipulating packets on the transport layer by changing transmission timing or by modifying the on-screen presentation by postponing UI updates or reducing frame rates. The system can do this because the system spans almost all layers.

In some embodiments, the system is also aware of the actual program type and can dynamically alter the priorities described above, possibly even reversing them. For example, video frames may be dropped to give user-interface elements priority to pass based on the knowledge that in this particular content, the user is expecting the UI graphics to appear and will not notice the dropped video frames (e.g., because the video is in a reduced size and not the focus of the user's attention). The priorities of video and user-interface elements thus may be reversed.

These three bandwidth mitigation techniques, combined with a flexible, class-based prioritization scheme, provide the ability to optimally control a digital-media multiplexing system.

The systems and methods described herein address (i) low session count on QAM (i.e., on a QAM channel), (ii) unused bandwidth, (iii) latency and non-smooth animations. Other problems addressed are if requested bandwidth temporarily exceeds available bandwidth, deferring bits could cause unpleasant user experiences, particularly connection loss, audio dropouts, and loss of video synchronization or uneven playback speed. By prioritizing these classes of bits, continuity can be guaranteed at the expense of only occasional increase in UI latency.

In addition, some embodiments described herein provide the following functionality:
  Allocating multiple sessions on one compositor on the Session Resource Manager (SRM) on one QAM (i.e., on one QAM channel), with static bandwidth allocations on the resource manager, and dynamically shifting bandwidth between sessions;
  Class-based bit budget allocation (audio/control, video, UI, intra-refresh); and/or
  Latency optimized scheduling of UI updates.

This flexible and dynamic bandwidth allocation allows for combining (multiplexing) streams that have variable bit rate requirements with a high peak-to-average ratio. Traditionally on a cable network, a CBR session is allocated on a QAM to guarantee sufficient quality of service. The bandwidth allocated is either set high, resulting in a large amount of unused bandwidth, or set low, resulting in higher latency and a non-smooth user experience. Other advantages of this flexible and dynamic bandwidth allocation include increased session count on QAM transport streams; less unused bandwidth, better (lower) latency, better animation smoothness, and the ability to trade off some quality for even higher session count.

In intelligent multiplexing (i-muxing), multiple user sessions share a set amount of bandwidth available to the i-mux group. The allocation occurs per frame time (e.g., 33 msec or 40 msec). If, during a frame time, the total sum of requested bandwidth for all sessions exceeds the available bandwidth of the i-mux group, the bit budget is allocated among the sessions and certain bits are deferred. Different classes of bits are allocated according to different priorities in the following order: (i) basic transport stream control and audio, (ii) video or partial-screen video, (iii) UI updates, and (iv) intra-refresh of video frames. (This list corresponds to the above list of five priority classes, except that bits for basic transport stream control and for audio are combined into a single highest-priority class.) The prioritizing of bits takes place while still generating a compliant MPEG transport stream for each session. Accordingly, the systems and methods described herein categorize bits into different classes, provide class-based allocation and, in case of delayed bits, create "filler slices" to maintain MPEG compliancy and provide feedback to the user-interface rendering engine to defer UI updates if necessary.

The following sections will explain how class-based, intelligent multiplexing is performed in cable television systems that use Switched Digital Video, Video-On-Demand (VOD), or interactive television services and simultaneously optimizes video quality and minimizes response time of interactive service over the same managed network of the cable plant while maintaining a standards-compliant transport stream suitable for decoding by the cable TV set-tops (e.g., set-top boxes) connected to the system.

FIGS. 5-9 are time-flow diagrams of class-based allocations for various scenarios. Each diagram depicts two sessions, a full-screen audio-video session ("session a") and a mixed user-interface and partial-screen audio-and-video session ("session b"), and their allotted allocations for CBR audio A, VBR video V, and VBR UI (User Interface) packets, during frame times t (i.e., t+0) to t+4. Each block in the time-flow diagram is labeled according to its allocation for a specific class, session and frame. For example, $UI_{b/0}$ identifies the allotted share of bandwidth for user-interface packets of session b, frame 0. The depicted blocks merely indicate a share of the total available bandwidth at frame time t+n. The blocks may include one or more transport stream (TS) packets and the scheduling of the packets within a frame time may be subject to other considerations than the class-based i-muxing allocation scheme explained herein. Also, a typical QAM modulator has more capacity than just for two sessions.

Throughout the scenarios depicted in FIGS. 5-9, the allocations for session a's audio and video elements are kept the same. Although all sessions within an i-mux group may be subject to class-based allocation policies, for clarity of the discussion the allocations in these examples only affect session b. Furthermore, the sessions' CBR audio is never part of the tradeoff. As noted earlier, the human brain is far more sensitive to audio glitches than it is to minor video latency, frame rate or quality degradation. (As it's known: the ears don't blink.)

Figure 5:
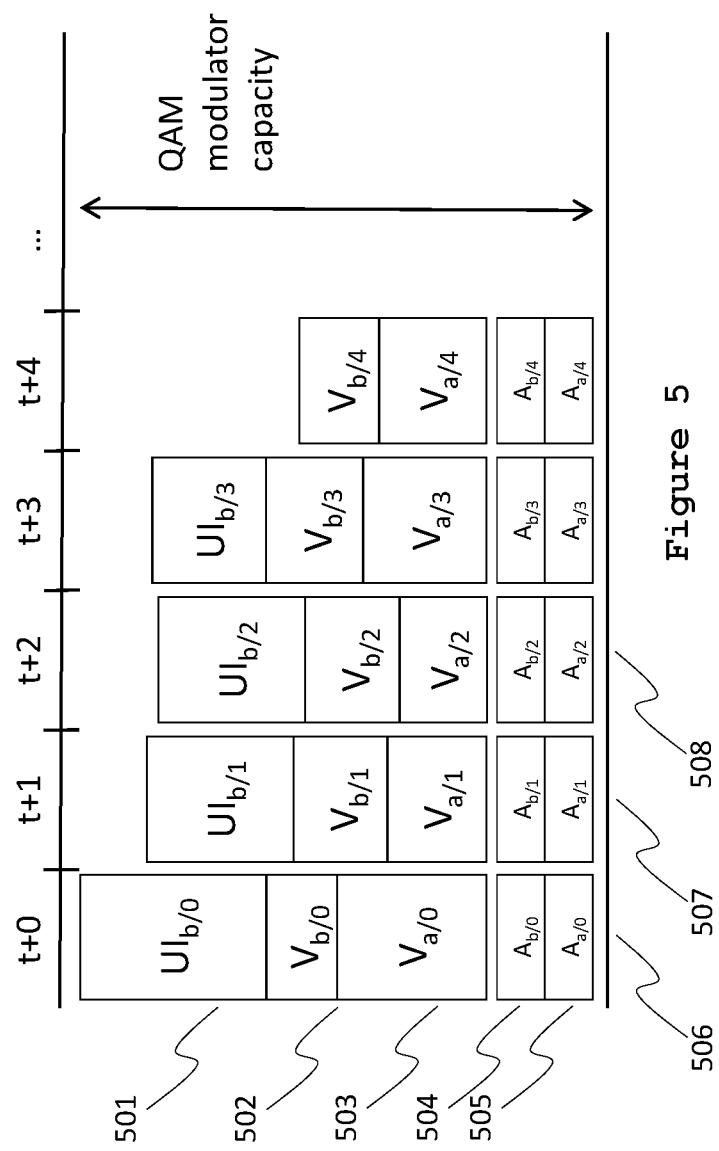
FIG. 5 is a time-flow diagram of class-based allocation, illustrating packet distribution where UI elements, video and audio elements of two sessions have adequate bandwidth within a QAM modulator.

A time-flow diagram of class-based allocation is shown in FIG. 5 where the allotted shares of audio, video and user-interface bandwidth for each frame fit the QAM modulator's capacity (i.e., the maximum bandwidth). The aggregate 506 of session a's audio share 505 and video share 503 and session b's audio share 504, video share 502 and user-interface share 501 for the frame at t+0 fits the QAM modulator's capacity available for the frame at t+0, as do the aggregates 507 and 508 for the capacity available at t+1 and t+2. ("Share" in this context refers to a share of the data in an i-mux group at a given frame time.)

Figure 6:
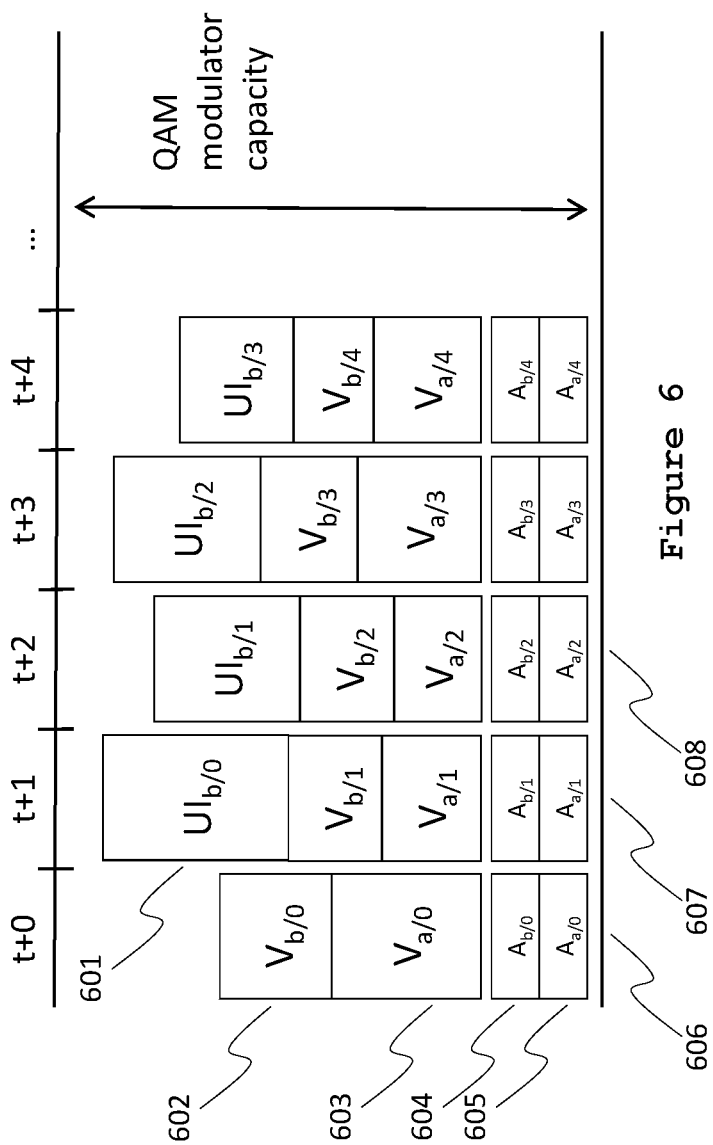
FIG. 6 is a time-flow diagram of class-based allocation where one-frame latency is introduced for the UI elements of session b to accommodate full frames for video elements and UI elements of both session a and session b.

For comparison, FIG. 6 is a time-flow diagram of a class-based allocation where the data for session b's user-interface elements, starting with 601, are delayed by one frame time (i.e., from t to t+1 for $UI_{b/0}$, from t+1 to t+2 for $UI_{b/1}$, from t+2 to t+3 for $UI_{b/2}$, and from t+2 to t+3 for $UI_{b/3}$) to accommodate for session b's larger share of data from its video elements. This delay is implemented in response to the fact that the aggregate 606 for frame 0 would exceed the QAM modulator capacity if $UI_{b/0}$ were included. Although the introduction of latency (in this example, a latency of one frame time) for the user interface may not generally be beneficial from an interactivity perspective, the skilled person may understand that it is by far the easiest to delay frames from the user interface. Moreover, not all data from the user-interface class may be the result of interactivity. Unsolicited updates (e.g., cover art, spinners or commercial banners) may occasionally animate. For such updates it is perfectly acceptable to give the data from the session's video elements preference over the session's user-interface elements.

Figure 7:
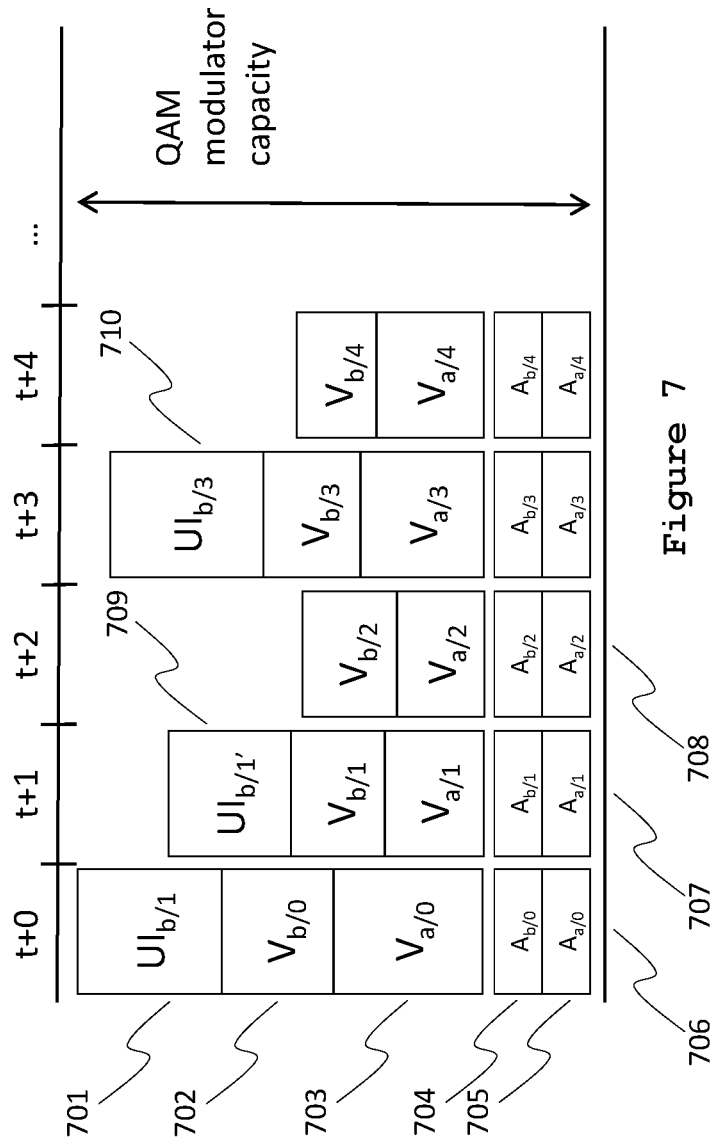
FIG. 7 is a time-flow diagram of an alternative class-based allocation scheme where session b's video elements are given precedence over session b's UI elements, by selectively dropping and rescheduling UI frames to make room for full-frame-rate video elements.

Conversely, FIG. 7 provides a time-flow diagram of an alternative class-based allocation scheme where instead of delaying the user-interface data of frame 0 to t+1, the frame rate for user-interface data is reduced. The user-interface data for frame 1 is rescheduled to be partially sent at t+0 (701) and the remainder at t+1 (709). Although user-interface data for frame 0 and frame 2 are dropped, the remaining elements are at their intended positions, thus masking the latency and possibly achieving intended synchronization of the user-interface elements with the video elements. Dropping frames for user-interface elements is particularly efficient since user-interface elements typically produce bursty data, easily exceeding the session's average bit rate. Reducing the frame rate by the factor the data exceeds the average is an effective method to keep the data within the allotted share without the introduction of latency, especially if the updates are part of an animation.

Figure 8:
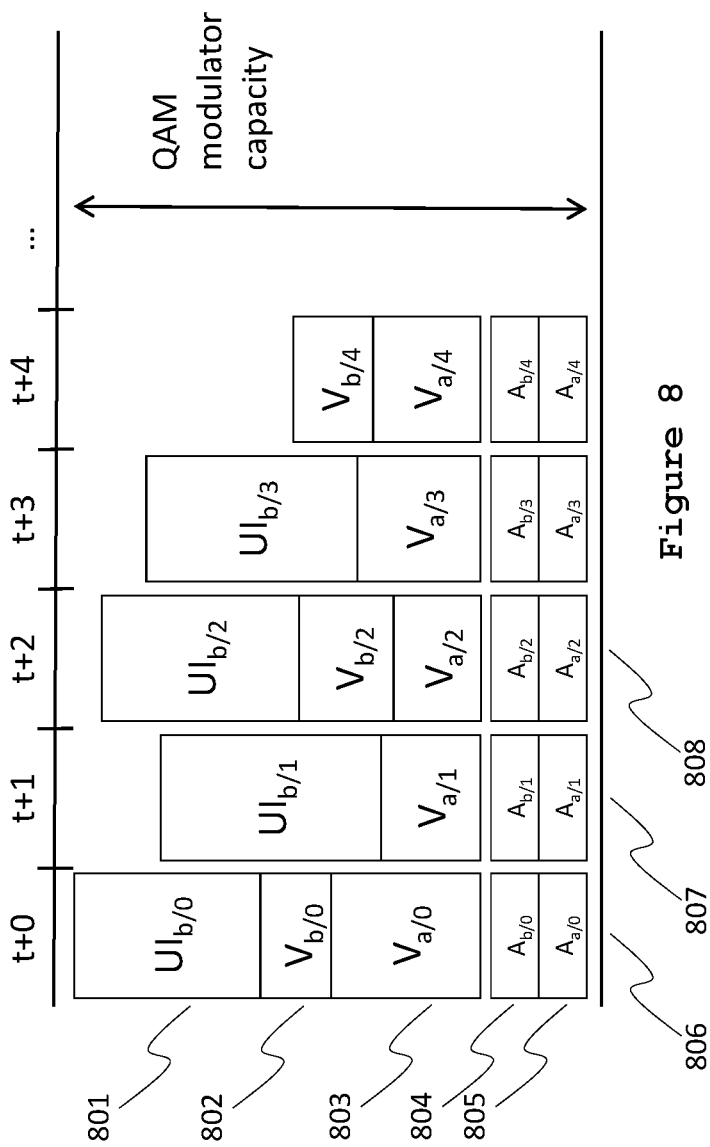
FIG. 8 is a time-flow diagram of an alternative class-based allocation scheme where session b's UI elements are given precedence over session b's video elements, by selectively dropping video frames to make room for UI elements.

FIG. 8 provides a time-flow diagram of an alternative class-based allocation scheme where instead of reducing the frame rate for user-interface elements of session b, frames (and corresponding packets) from the video elements are dropped. When comparing aggregate 807 to aggregate 507, it can be seen that $V_{b/1}$ (i.e., session-b video data for frame 1) is dropped at t+1 to accommodate the larger $UI_{b/1}$ (i.e., the session-b user-interface data for frame 1). If the user-interface elements update because of input from the user, it may be assumed that the focus of the user is on the animating (i.e., updating) user-interface elements. Hence, the user may not notice a reduced frame rate of the video elements and frames from these elements may be dropped to accommodate the data from session b's user-interface elements.

Figure 9:
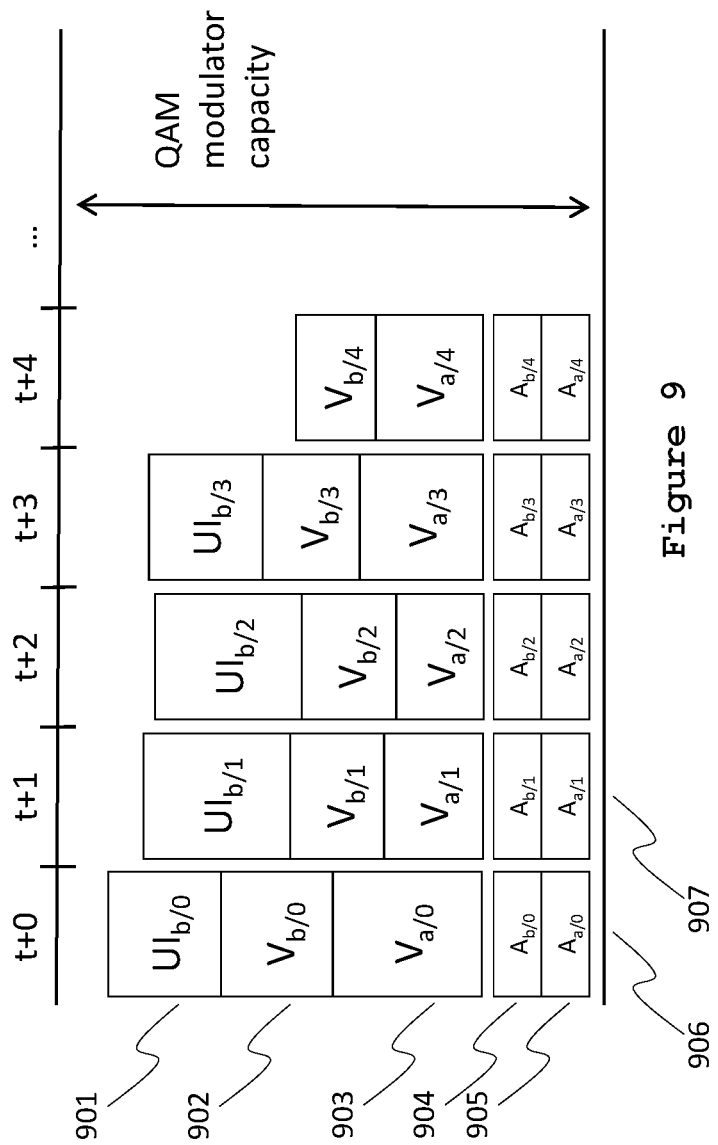
FIG. 9 is a time-flow diagram of an alternative class-based allocation scheme where the quality of session b's UI elements is reduced to make room for session b's full-frame-rate video elements, while keeping the UI elements also at full frame rate.

Finally, FIG. 9 provides a time-flow diagram of an alternative class-based allocation scheme where no frames are dropped, but the size of the user-interface elements data 901 for frame 0 (i.e., $UI_{b/0}$) is reduced compared to 501 by reducing the quality of the update, for example through a higher quantization, to accommodate the larger share of video data 902 compared to 502. Such a reduction may be particularly suited for updates that are part of a series of updates or animation, but may be less suited for updates that will remain on the screen for a longer time, such as for example the last frame of an animation or the end state of an updated user-interface element.

Figure 10:
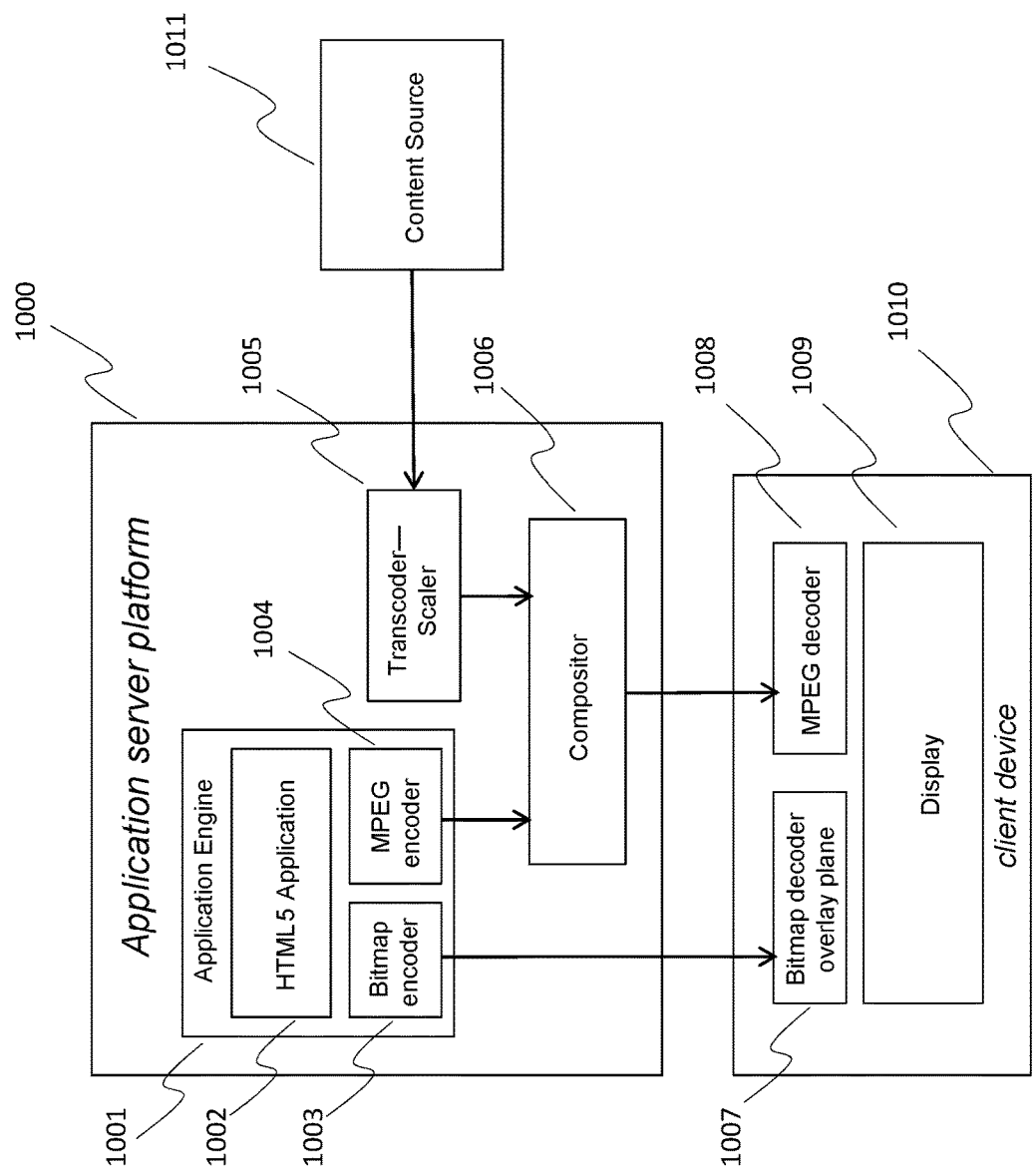
FIG. 10 is a schematic of an application server platform and client device according to some embodiments of a cloud-based application server system that generates the various audio, video and graphical elements to be multiplexed and sent to the client device.

To help illustrate the interaction between the elements of the server and relationship between the server elements and the client device without regard to specific elements of the communications network (i.e., of the distribution network), FIG. 10 provides a block diagram overview. An application server platform 1000 (also referred to as an application server or remote application server), which is an example of the server system in the allocation examples of FIGS. 5-9, includes two or more sources that generate audio-visual information to be conveyed to a client device 1010 of a specific consumer at a remote location. One source of audio-visual information is the application engine 1001, which hosts (executes) a software application on an HTML5 application processor 1002, which itself is but one possible processor of many known to those skilled in the art. The consumer interacts with the application engine 1001 via a network, which could be a cable television network or the Internet. The application engine 1001 creates at least two types of visual information. One type of visual information is graphical bitmaps, such as on-screen menus or other static information displays. The bitmaps are encoded by a bitmap encoder 1003. In this example, the bitmap output of 1003 is transmitted through the network to a client device 1010 that is capable of rendering graphic overlays on command from the application server platform 1000. Otherwise, for client devices not capable of locally rendering graphic overlays, the bitmap outputs are first rendered to MPEG and then combined in the compositor 1006 prior to transmission to client device as a completed video frame.

Another source of audio-visual information that produces output in response to the consumer interaction at the client device 1010 with the remote application server 1000 is by MPEG encoder 1004, which encodes or re-encodes full-motion video from a plurality of sources such as Internet videos (e.g., from a service such as YouTube) or video servers associated with the cable television system that hosts the application server 1000. Yet another source of full-motion video comes from content source 1011 that might come from an Internet-based video service or website featuring video clips (e.g., YouTube) or other service (e.g., Netflix) which provides long-form content such as feature films.

Most Internet video sources do not produce video streams that are in an encoded-video format compatible with cable television digital set-top boxes, and, therefore, the server system may transcode the video from the native format of the content source 1011 to MPEG-compatible format compatible with the client device 1010. An additional benefit of the application server platform 1000 is the ability to mix video and graphics information in many combinations of overlays as well as picture-in-picture windows, among many other options. This combination of resources can be programmatically determined by the application engine 1001, which outputs a single MPEG stream representing the composite audio-video information that is streamed to the client device 1010. In other embodiments, full-motion, full screen video from either MPEG encoder 1004 or content source 1011 is sent to the Client 1010, and user-interface controls (e.g., digital video recorder (DVR) controls to play, stop, fast-forward, etc.) are sent to client 1010 by the bitmap encoder 1003 to be rendered by bitmap decoder 1007 and displayed as an overlay of the full-screen video as rendered by MPEG decoder 1008.

The client (e.g., client device 1010) and the server (e.g., application server platform 1000) are, in cable television systems, separated by a managed digital network that uses well-known digital video transport protocols such as the Society of Cable Telecommunications Engineers' Service Multiplex and Transport Subsystem Standard for Cable Television (SMTS) for United Stated cable TV or DVB-C for most international cable systems. In this instance, 'managed' means that bandwidth resources for providing these services may be reserved prior to use. Once resources are allocated, the bandwidth is generally guaranteed to be available, and the viewer is assured of receiving a high-quality interactive television viewing experience. When configured properly, class-based intelligent multiplexing provides consistent delivery such that the user generally cannot tell that the interactive television application is being executed on a remote server and is not, in fact, executing in the set-top box, smart TV or whatever client device is displaying the resulting audio-video information.

Figure 12:
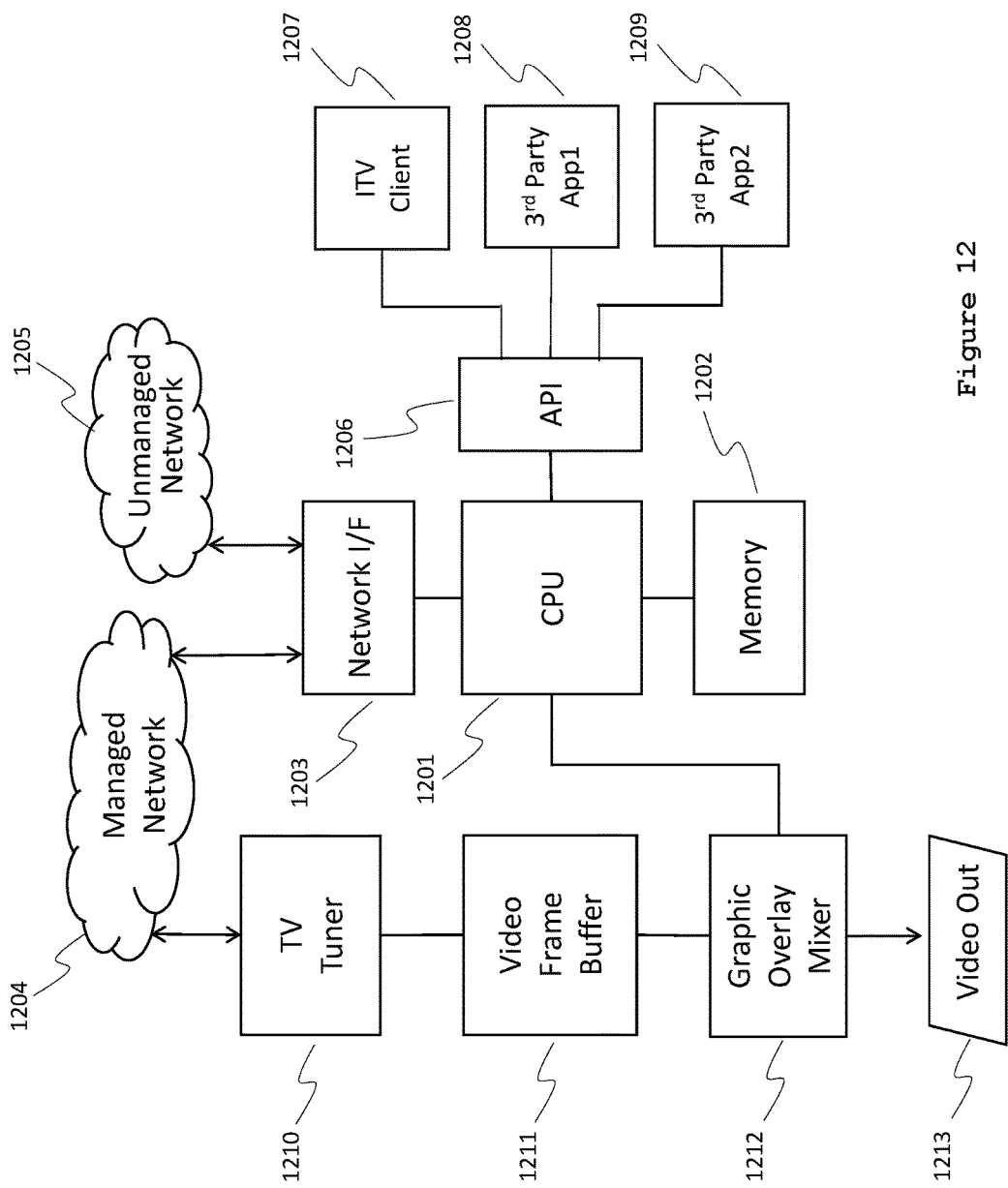
FIG. 12 is a schematic of a client device (e.g., a set-top box or smart TV host system) running an ITV client application and third-party applications.

FIG. 12 is a schematic according to some embodiments of a client device (e.g., a set-top box or smart TV host system) running a dedicated ITV client application 1207 and third-party applications 1208 and 1209. A tuner 1210 feeds the signal from a particular program and channel to a video frame buffer 1211. A graphic overlay mixer 1212 adds certain locally generated graphics and combines them with the video signal from the video frame buffer 1211, in accordance with information supplied to central processing unit (CPU) 1201. CPU 1201 draws on inputs from the managed cable system network 1204, an unmanaged network (e.g., the Internet) 1205, various third-party applications 1208 and 1209, and the dedicated ITV client application 1207. A network interface 1203 provides inputs from the managed cable system network 1204 and unmanaged network 1205 to the CPU 1201. An application programming interface (API) 1206 serves as an interface between the CPU 1201 on one side and the various third-party applications 1208 and 1209 and dedicated ITV client application 1207 on the other side. The graphic overlay mixer 1212 generates a video output ("video out") signal that is sent to a display.

The systems and methods for intelligent multiplexing described herein allow high-quality interactive television applications to be offered to client devices, and thus to the consumer, from a central location (e.g., the cable television headend) in place of interactive applications that run on the client device (e.g., in the consumer's home). Intelligent multiplexing thus provides interactive television applications to consumers through client devices that are not running dedicated ITV client applications 1207.

Figure 11:
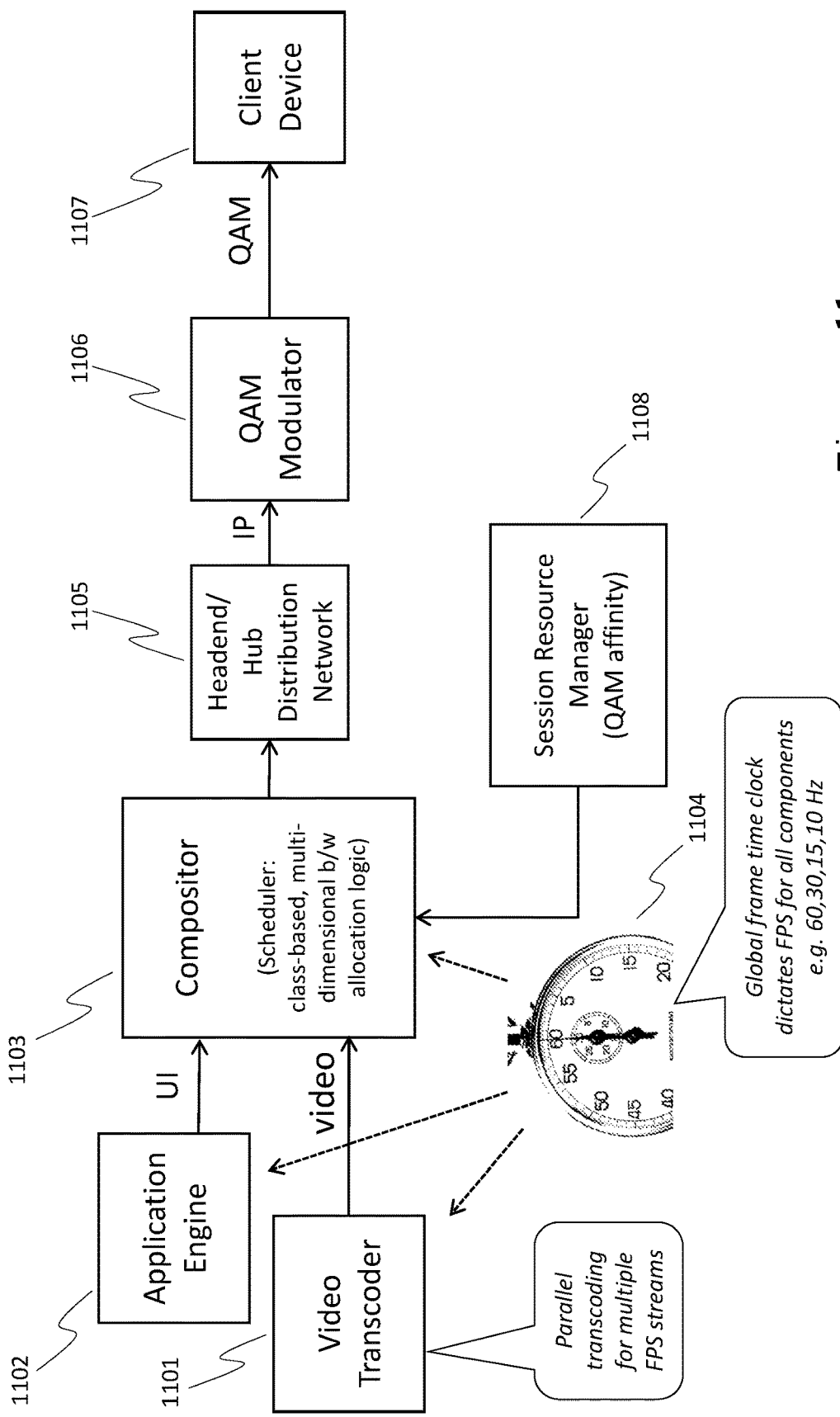
FIG. 11 is a schematic according to some embodiments of an interactive television (ITV) application server and client device depicting distribution-network elements.

FIG. 11 is a schematic of an ITV application server (e.g., the application server platform 1000, FIG. 10), a client device 1107 (e.g., client device 1010, FIG. 10), and distribution-network elements, in accordance with some embodiments. The application engine 1102 is the programmatic means by which the user interacts with the application server via the client device 1107 via bandwidth provided by the headend or hub distribution network 1105 utilizing QAM modulators 1106 (e.g., for a cable TV network). The session output (audio, video, and graphics) from the application engine 1102 and/or the video transcoder 1101 is sent downstream to the client device 1107 over the network.

The session resource manager 1108 advantageously assigns dedicated user sessions from the headend 1105 to client devices 1107 using the managed network of the cable television system.

The timing of compositor 1103 is controlled by means of a global frame-time clock 1104, which maintains a cadence that coordinates the combination of video, audio, and user-interface graphical elements such that as smooth as possible playback occurs on the client device 1107.

To perform statistical multiplexing, groups of streams that can share bandwidth are identified. (In this document, bandwidth means bits per second, not hertz). In existing cable television distribution systems employing switched digital video (SDV) and video-on-demand (VOD) services, multiple user sessions already share a common resource, which is the digital video Transport Stream (MPEG Transport) usually transmitted via a quadrature-amplitude modulated (QAM) carrier which is modulated into a six megahertz bandwidth slot (i.e., channel) in place of the older analog television signal of NTSC or an eight megahertz bandwidth slot (i.e., channel) in place of the older SECAM or PAL television signals. It is therefore logical to choose the Transport Stream on a QAM (or frequency-QAM pair) as the group within which class-based intelligent multiplexing ("i-muxing") is performed.

When allocating resources for a switched video session of any type, the digital information is routed to one or more specific QAM modulators 1106 serving the neighborhood that services the subscriber requesting the service. The resulting set of QAM-modulated transport streams may already carry allocations for other i-mux sessions. To have maximum benefit from intelligent multiplexing, multiple sessions should be allocated to a single QAM modulator until its bandwidth is fully allocated following the vertical allocation strategy, called QAM affinity, illustrated in FIG. 2.

Managing Groups of Interactive Television and VOD Sessions Utilizing QAM Affinity QAM affinity is a process by which each multiplex group is filled, as much as possible, before additional multiplex groups are utilized. QAM affinity is the converse of linear (or non-interactive) video services where QAM loading is spread out among available modulators as evenly as possible. In addition, all sessions in a statistical multiplexing group will be served by the same i-mux process. QAM affinity is performed instead of allowing sessions to be load-balanced in an arbitrary fashion: if an intelligent multiplexer (i-mux) is already muxing a stream onto a given QAM channel, then a next session on that same QAM channel should be allocated to the same i-mux so that bandwidth can be shared between the sessions and the merits of intelligent multiplexing can be enjoyed. Additionally, it is beneficial in some cases to group sessions on the same service area on the same i-mux such that the i-mux controller can allocate bandwidth across multiple mux channels into a single neighborhood.

Figure 13:
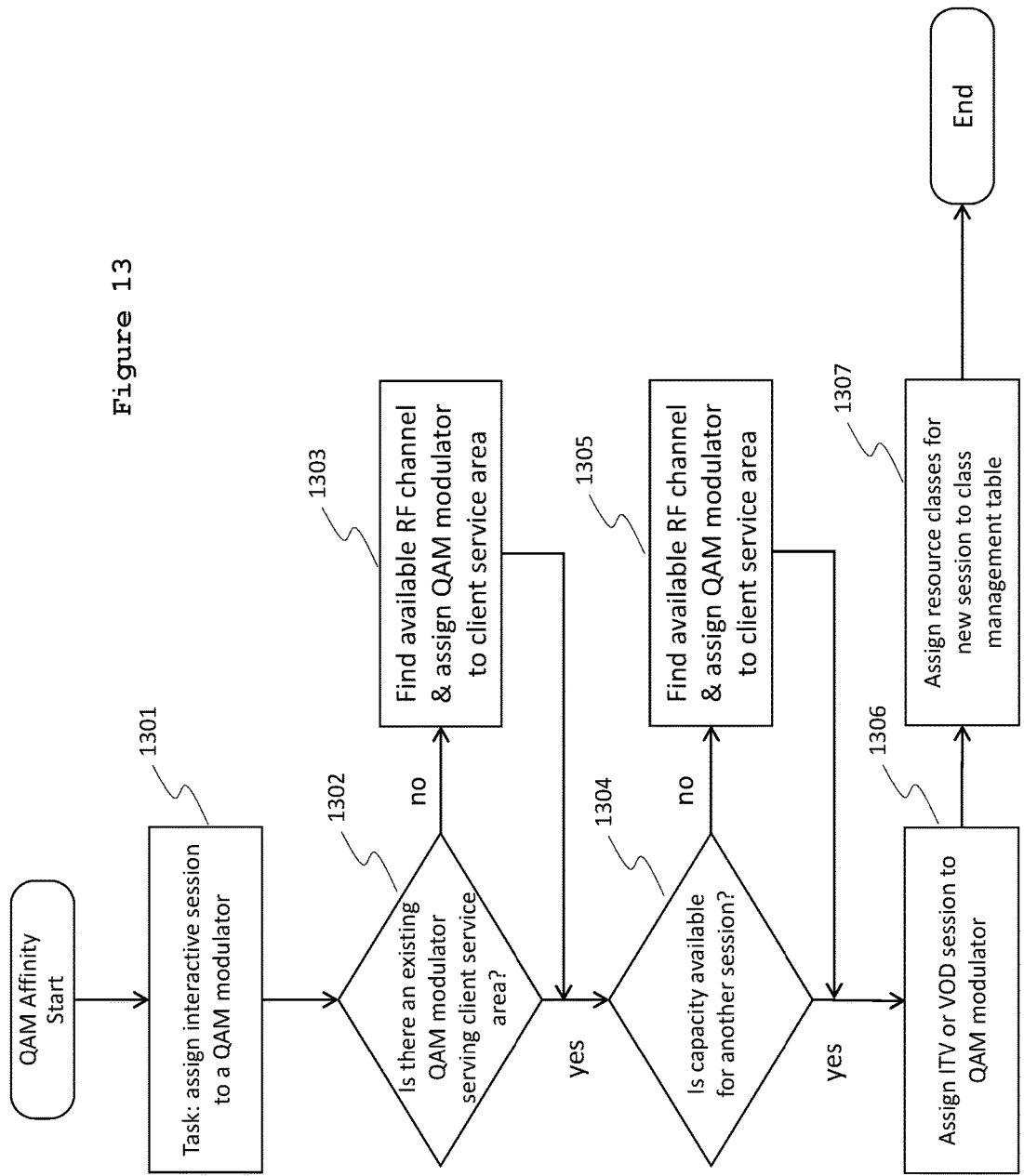
FIG. 13 is a flow chart depicting a method of assigning an interactive television or video-on-demand (VOD) session to a specific QAM modulator using the QAM affinity process in accordance with some embodiments. The interactive television session streams are managed as a group and by geographic region such that the sessions can be managed by class-based intelligent multiplexing as a group without impacting non-interactive content which cannot be managed.

FIG. 13 is a flow chart depicting a method of assigning an interactive television (ITV) or video-on-demand (VOD) session to a specific QAM modulator using the QAM affinity process in accordance with some embodiments. In the method, a task of assigning an interactive session to a QAM modulator is identified (1301). It is determined (1302) whether there is an existing QAM modulator serving the client service area (i.e., the service location of the client device). The service location of a client device (e.g., set-top box) is provided by the client device itself in some cable television systems, or it may be read from a central database maintained by the cable system. If there is no such QAM modulator (1302—no), an available RF channel is found (1303) and a corresponding QAM modulator is assigned (1303) to the client service area.

It is then determined (1304) whether there is capacity available on the existing (or newly assigned) QAM modulator for another session. If capacity is available (1304—Yes), then the ITV or VOD session is assigned (1306) to that QAM modulator. The determination 1304 and subsequent assignment 1306 keeps sessions for a particular service area grouped on the same QAM channel as much as possible. If capacity is not available (1304—No), then an available RF channel is found (1305) and a corresponding QAM modulator is assigned (1305) to the client service area. The ITV or VOD session is then assigned (1306) to the QAM modulator. Resource classes for the ITV or VOD session are assigned in a class management table (1307), and the method of FIG. 13 ends. The class management table is maintained by the compositor 1103 in accordance with some embodiments.

As defined above, there are two methods to allocate resources to a QAM-modulated channel: vertically (e.g., as in the method of FIG. 13) to fill up one QAM first before allocation to another and horizontally to allocate resources to QAM channels in a round-robin fashion to evenly distribute channel loading and to maximize redundancy.

Figure 2:
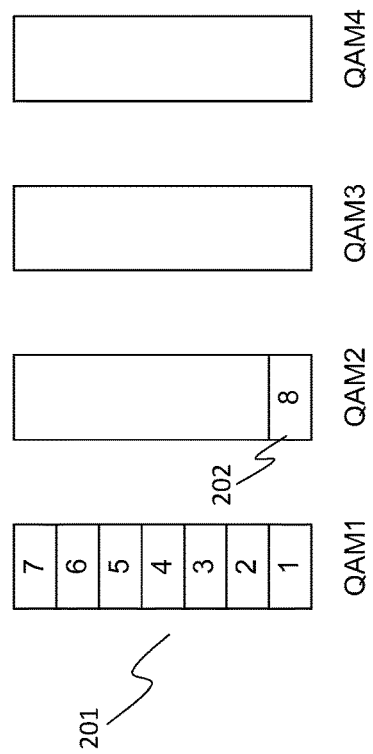
FIG. 2 illustrates a vertical allocation strategy of assigning user sessions to a particular quadrature amplitude modulation (QAM) modulator until it is full, then allocating sessions to the next modulator with the goal of fully loading one modulator before allocating sessions to another, in accordance with some embodiments. This allocation strategy is also known as modulator (or QAM) affinity and is beneficial where high volumes of interactive television signals are multiplexed.
Figure 3:
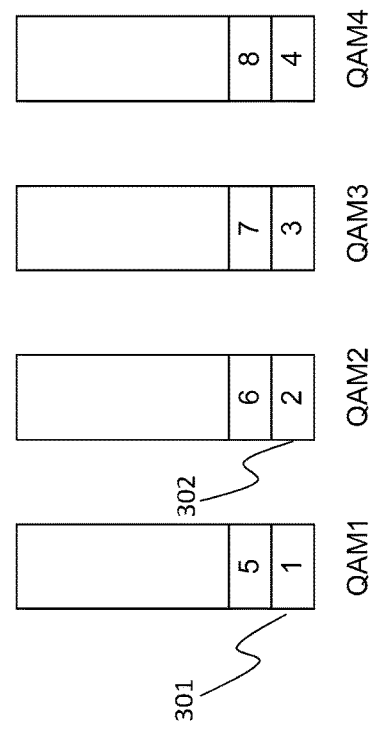
FIG. 3 illustrates a horizontal allocation strategy of evenly assigning user sessions among all available QAM modulators. This allocation strategy is beneficial for multiplexing mostly linear television programming.

FIG. 2 illustrates a situation where resources for eight sessions have been allocated using the vertical distribution approach with 201 (QAM 1) being filled first and 202 (QAM 2) being used for the next group of interactive sessions. FIG. 3 illustrates the horizontal approach with the first session being allocated to 301 (QAM 1) and the next session to 302 (QAM 2) and so on across all QAM channels.

A vertical allocation strategy results in more opportunity for statistical multiplexing using class-based allocation: in the horizontal-allocation strategy example each QAM channel has only two sessions. The drawback of vertical allocation is that QAM channels are not equally loaded, and should a fully loaded QAM channel develop a fault and cease operating, more sessions are affected than in the horizontal allocation case. For ordinary television broadcasts, a failed QAM channel impacts many end-users and an operator may choose to have redundant QAM modulators allocated via automatic failover; however, for unicast (one-to-one) interactive sessions, a failed QAM impacts far fewer end-users and redundancy is less important. The improved quality and efficiency benefits of vertical allocation outweigh the drawbacks of reduced redundancy.

In some embodiments, from a high-level view, intelligent multiplexing includes the following functions:

A grouping function in the i-mux that manages bit allocations for each session in the group of sessions as a whole;

A load-balancing and resource-management function that selects an i-mux to serve a session based on QAM affinity, determined by the location of the service area of the session.

A vertical allocation function.

The compositor, via communications with a session resource manager, creates and manages groups. In some embodiments, the compositor has the following capabilities:

Define (add) a group, where the group receives an identifier and an aggregated bandwidth (in bits per second);

Modify the bandwidth for a certain group; and/or

Delete a group and close the session.

Furthermore, when configuring a session, an optional group identifier can be passed to signal the application of intelligent multiplexing. If the group identifier is not present, intelligent multiplexing is not performed. The bit allocation of the compositor continues to respect the individual stream's bandwidth; when multiplexing the streams at the output of the compositor, the aggregated bandwidth allocated to the group of sessions (if present) is respected as well. Screen updates are delayed that do not fit in the session's bit budget or in the group bit budget, where an update gets a priority that increases with waiting time.

Alternative behaviors to mitigate bandwidth constraints could be to select a representation of the same content with fewer bits:

For video content encoded with multiple bitrates, select a lower bit rate version.

For UI content, select a representation of the same fragment with fewer bits, by applying greater video compression to the encoded fields.

Furthermore, the server system can configure the average bit rate (as opposed to 'base' amount) and add a headroom (or reserve) amount that decreases as the number of sessions grows. The more sessions there are, the better the i-mux is able to make use of the multiple channels' fungible bandwidth so the need for additional headroom gradually decreases. The advantage to this approach is that as the QAM channel is nearing full capacity, the headroom is almost zero, thus maximizing the QAM usage.

For the streaming GUI use case (i.e., a user application operating from a location remote from the user) the bandwidth requested for a session depends on the application that is executed. Furthermore, this bandwidth is requested in advance. Since multiple sessions share a part of the bandwidth, less bandwidth is reserved than the expected nominal application bandwidth. If for example the application has been designed for a maximum video stream density requiring 8 Mbps, then the system typically reserves only 2 Mbps or a "base amount". Therefore, 6 Mbps of additional bandwidth is considered "headroom" and needs to be reserved separately, to ensure that the necessary bandwidth is always available. Therefore, the following steps are typically taken:

1. Reserve a headroom amount for a dummy session, that is, a session that will not output any data but helps with the establishment of other sessions by reserving a common overhead space to be shared by the other sessions.
2. For each new (actual) session, the system reserves the base amount (e.g. –2 Mbps in the example above.)
3. The dummy session will be associated with a unique address and port at the QAM modulator but no bits are actually sent. Hence, the associated program identifier (service ID) on the corresponding transport stream will carry no bits. Likewise, in some cases, the dummy session does not require a service ID to be associated to it. This is typically a scarce resource on a QAM (a small amount of predefined service IDs exist per Transport Stream). Therefore, preferably a service ID is not allocated for the dummy sessions (or dummy resource blocks).
4. When the last session in a group has terminated, the dummy session can be also terminated.

Once the base amount and headroom are defined, the application stays within the base amount plus headroom to accommodate worst-case situations. (For some applications the base amount would fluctuate depending on number of video titles available.) This aspect is not different from the non-intelligent-muxing use case. However, what is different is that when more sessions are added to the group, the headroom is shared among more sessions and the probability of undesirable congestion due to insufficient aggregate bandwidth increases. So with intelligent multiplexing, if an interactive session is the only one, then the application may respond quickly. Correspondingly, when more sessions are added, the latency imposed on the interactive session may increase. If that occurs, then the base amount and headroom could be increased.

In a further refinement, the headroom for a multiplex channel can be allocated as a whole, or it can be allocated as blocks (e.g., of one Mbps) to allow headroom to be gradually reduced as described above, to allow different headroom sizes to be used as different application mixes are used on the same QAM channel; each application has its own characterization in terms of base & headroom, or average bit rate & max bit rate.

The i-mux bit rate allocation works on two time domains. The first is per-frame: it must stay within the group bandwidth, and will do this by delaying UI updates or dropping frames. The second time domain is a feedback loop that requests more bandwidth for a group, rejects new sessions, or refuses requests from applications to play video (and indicates to the application that video is being refused so that the application can display a user-friendly message). The second-time-domain feedback loop is an algorithm that uses inputs such as needed vs. obtained bandwidth, measurement of latency due to i-muxing (for example as a histogram), frame drop rate, and other metrics. These inputs lead allow the i-mux to automatically increase or decrease an i-mux group bandwidth. In the absence of such an algorithm, the application could indicate to the i-mux that it requires more bandwidth, which the i-mux will then request from the Session Resource Manager (SRM) 1108 of FIG. 11.

Figure 14:
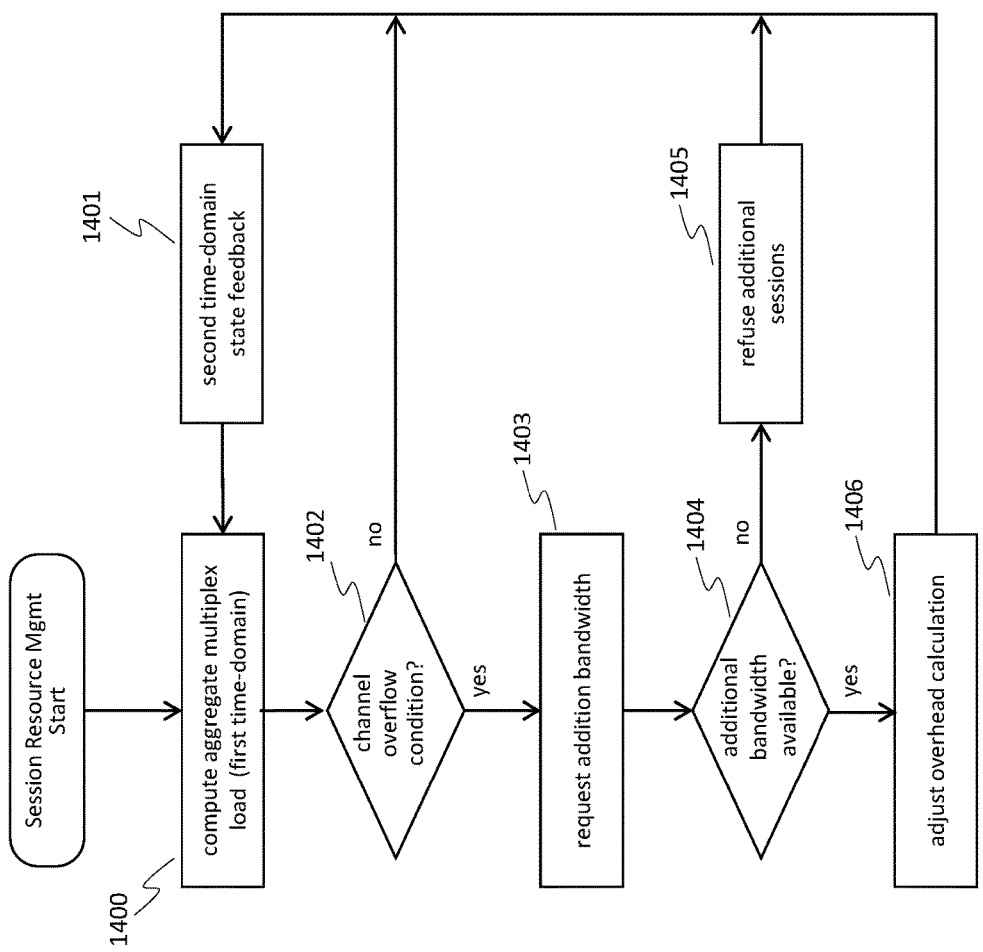
FIG. 14 is a flow chart depicting a process of managing a group of streams within a multiplex group in accordance with some embodiments.

FIG. 14 is a flow chart depicting a process of managing a group of streams within a multiplex group in accordance with some embodiments. FIG. 14 represents the top layer (i.e., level) of a multi-layer process of intelligent multiplexing. Element 1400 represents the process depicted in FIG. 15 while FIG. 15, in turn, includes an element 1506 detailed in FIG. 16.

An aggregate multiplexed load for the first time domain is computed (1400). The aggregate multiplexed load is compared to the available channel bandwidth to determine (1402) whether an overflow condition has occurred. If an overflow condition has not occurred (1402—No), feedback of state information is performed for the second time domain and the computation 1400 is repeated. If an overflow condition has occurred (1402—Yes), the server system requests (1403) additional bandwidth from the cable system for a potentially over-subscribed multiplex stream. If additional bandwidth is available (1404—Yes), the overhead calculation is adjusted (1406) to account for the additional bandwidth, and execution of the method transitions to element 1401. If additional bandwidth is not available (1404—no), additional sessions are refused (1405), such that no additional sections can be added to the i-mux group. In some embodiments, existing session are informed that bit sacrifices to one or more sessions will be necessary (e.g., are instructed to sacrifice bits), in response to the lack of availability of additional bandwidth (1404—no).

Class-Based Allocation

The transport stream bits cannot be delayed or dropped as the transport information provides the necessary support information, such as access control and critical timing signals among many other duties. Hence, it is assumed that the transport stream is provided with the bandwidth required.

Similarly, audio should not be interrupted as humans react poorly to disrupted audio, much more so than disrupted video. Hence, several strategies are employed to maintain smooth audio flow. In general, audio gets priority over video but should the need arise, audio can be sent ahead in blocks to an audio buffer of the client device and played out from the client audio buffer in timestamp-directed coordination with its respective video stream. Unlike conventional systems, the system described herein sends audio ahead to make room for oversize graphical elements of a user interface.

Video has the third priority, with the understanding that excessive compression of video is generally undesirable. Video bit-rate is generally reduced by conventional systems by raising the quantization level of the compression means (of, e.g. MPEG2 or H.264/5). The invention seeks to avoid the visual degradation of the system and will instead first seek to sparingly drop video frames. Especially in the case of video in a window of an interactive application, the means of substituting video frames with null frames provides an effective means to control video bandwidth.

The user interface graphics have the next priority after video. As these elements are generally not moving or are moving slowly, the delivery may be delayed briefly when congestion in the channel is eminent. However, the decision logic of the intelligent multiplex can be programmatically informed of the nature of the interactive application and can choose to raise the priority of the user interface graphics in the event that the video associated with the application is less important that the prompt appearance of a user interface element such as a menu appearing when a user clicks a button on the remote or clicks a virtual button displayed on the screen. A ready example would be a television program guide displaying many video windows of different television channels. When a user elects to interact with a menu, signaled by the button press, that person's attention is not likely on the various video windows. Hence, video frames can be dropped to make way for graphical elements of the interface without the user noticing the difference in the video picture, which is predictable especially for video in a window within a larger user interface application.

Figure 15:
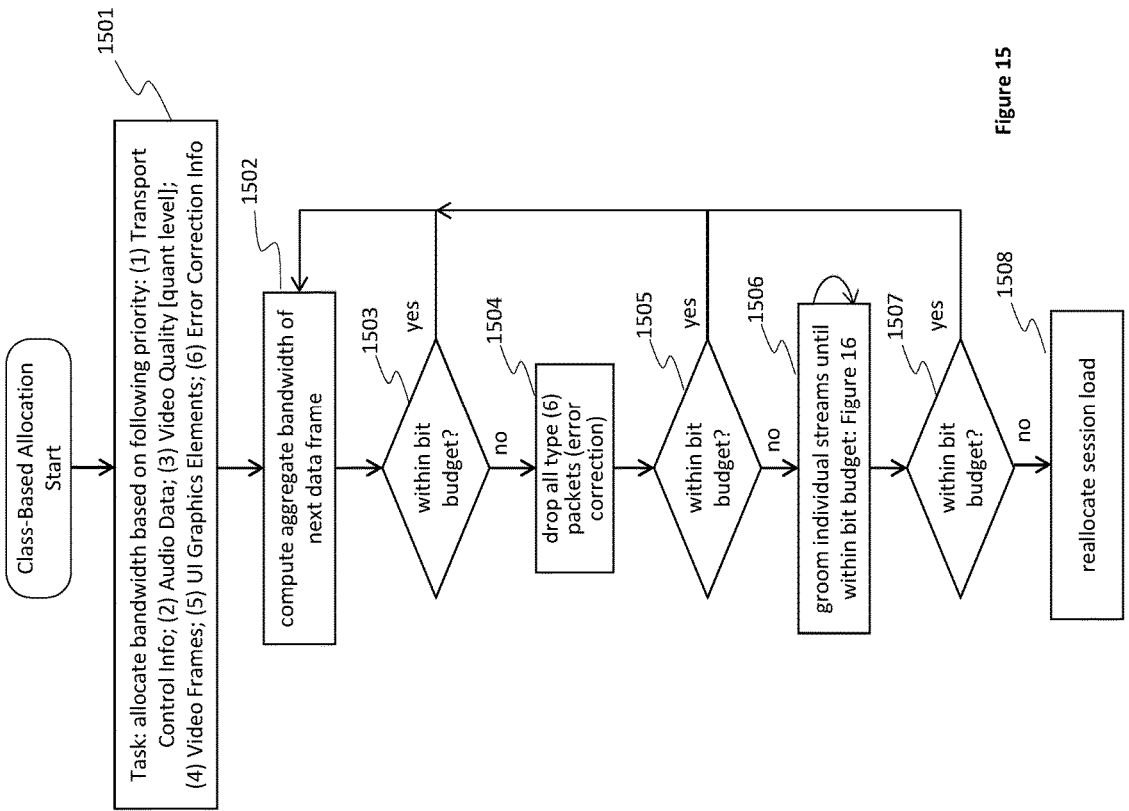
FIG. 15 is a flow chart depicting a method of managing class-based allocation for multiplexing audio, video and graphical user interface (UI) elements, in accordance with some embodiments.

FIG. 15 is a flow diagram illustrating a method of managing class-based allocation for multiplexing audio, video, and GUI elements, using the priorities described above, in accordance with some embodiments. Bandwidth is allocated (1501) to the audio, video, and graphical user interface (UI) elements based on the following priorities, listed in order from highest priority to lowest priority: (1) transport control information, (2) audio data, (3) video quality (quantization level), (4) video frames, (5) GUI elements (i.e., UI graphical elements), and (6) error-correction information. This list of priorities corresponds to the previously presented list of five priority levels, except that video quality and video frames are broken out into two different priority levels. These priorities are not absolute and can be altered (e.g., in real time) depending on specific circumstances such as a change in the application program creating the output to be multiplexed (e.g., the user switches from a video game to a program guide.)

The aggregate bandwidth of the next data frame is computed (1502). If the aggregate bandwidth is within the bit budget (1503—Yes), no action is taken and the method returns to operation 1502 for a subsequent data frame. If the aggregate bandwidth is not within the bit budget (1503—No), all priority-6 packets (i.e., with error-correction information) are dropped. If this action drops the aggregate bandwidth to within the bit budget (1505—yes), no further action is taken and the method returns to operation 1502 for a subsequent data frame. If, however, the aggregate bandwidth is still not within the bit budget (1505—no), individual streams are groomed until the aggregate bandwidth is within the bit budget (1507—yes), at which point the method returns to operation 1502 for a subsequent data frame. Grooming of an individual stream is performed in the method of FIG. 16, described below. If grooming streams does not reduce the aggregate bandwidth to within the bit budget (1507—no), then the session load is reallocated (e.g., one or more sessions is reassigned to a different QAM modulator and corresponding channel).

Figure 16:
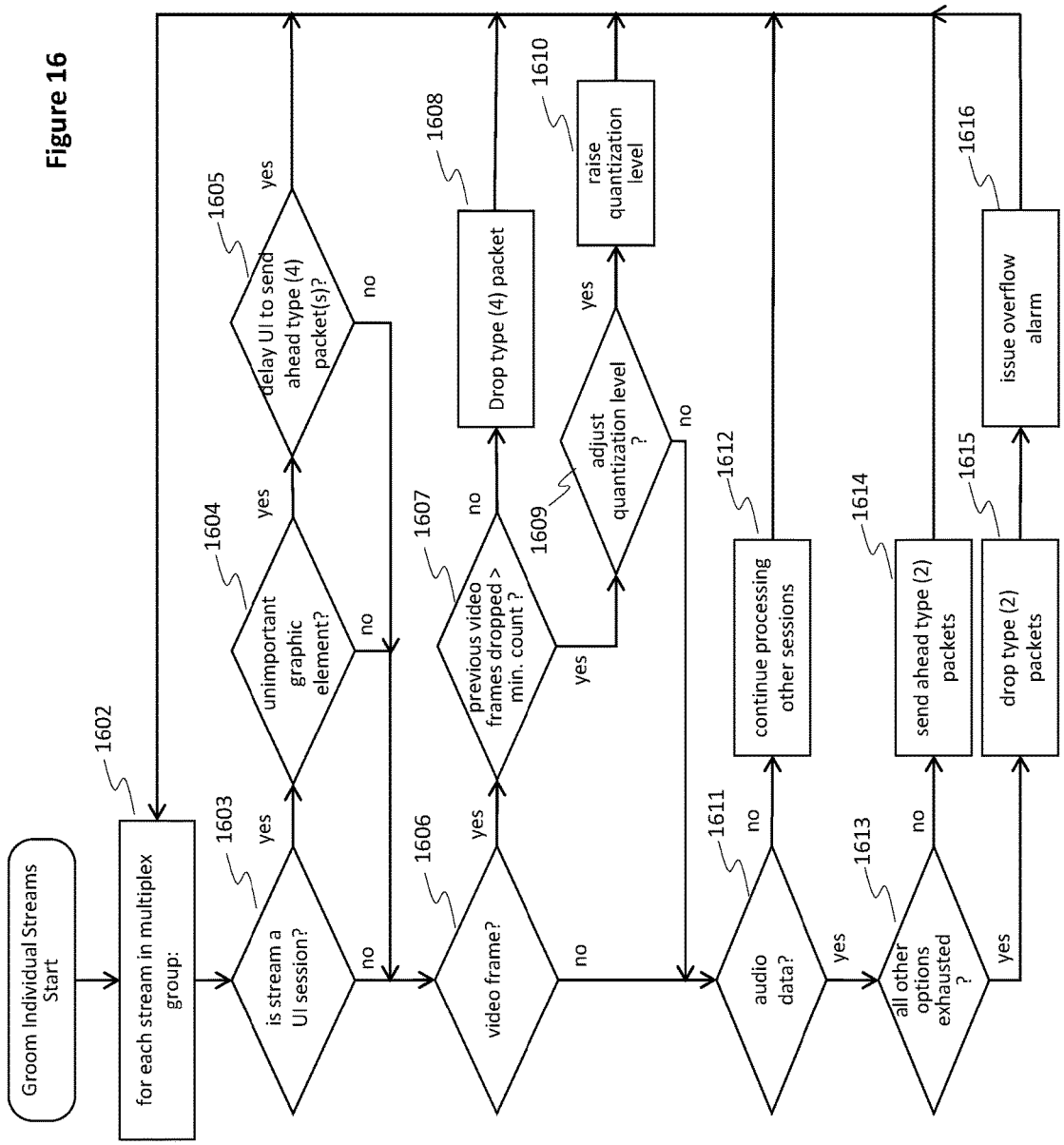
FIG. 16 is a flow chart depicting the process, in the method of FIG. 15, of individually grooming a single stream with the first time domain of the intelligent multiplexing process, in accordance with some embodiments.

FIG. 16 is a flow chart depicting the process, in the method of FIG. 15, of individually grooming (1506) a stream with the first time domain of the intelligent multiplexing process, in accordance with some embodiments. This process is performed (1602) for each stream in a multiplexed group. If the stream is a UI session (1603—Yes), it is determined (1604) whether the corresponding graphical element is unimportant (i.e., whether an importance of the graphical element satisfies a criterion). If the graphical element is not important (i.e., its importance does not satisfy the criterion) (1604—Yes), it is decided (1605) whether to delay the information in the UI session in favor of sending ahead one or more type-4 (i.e., video frame) packets. If so (1605—Yes), this action is taken and grooming then begins (1602) for another stream. If this action is not taken (1605—No), or if the graphical element is determined (1604—No) to be important (i.e., its importance satisfies the criterion), then processing continues (1612) for other sessions, and thus for other streams in the multiplex group. (Operation 1612 is reached through operations 1606—No and 1611—No.)

If the stream is video (i.e., corresponds to a video frame) (1606—Yes), it is determined (1607) whether a count of previously dropped video frames satisfies (e.g., is greater than, or greater than or equal to) a minimum count. If not (1607—No), a type-4 packet is dropped (1608) to free up bandwidth for the multiplex group. Grooming then begins (1602) for another stream. If so (1607—Yes), it is decided (1609) whether to adjust the quantization level of the video. If so (1609—Yes), the quantization level is raised (1610), thus lowering the video quality and freeing bandwidth for the multiplex group. If not (1609—No), then processing continues (1612) for other sessions, and thus for other streams in the multiplex group.

If the stream is audio (1611—yes), one or more type-2 (i.e., audio) packets may be sent ahead (1614) to be to be queued at the client device before being played. If this and all other options have been exhausted (1613—yes), however, then one or more type-2 (i.e., audio) packets are dropped (1615) and an overflow alarm issues (1616).

Figure 4A:
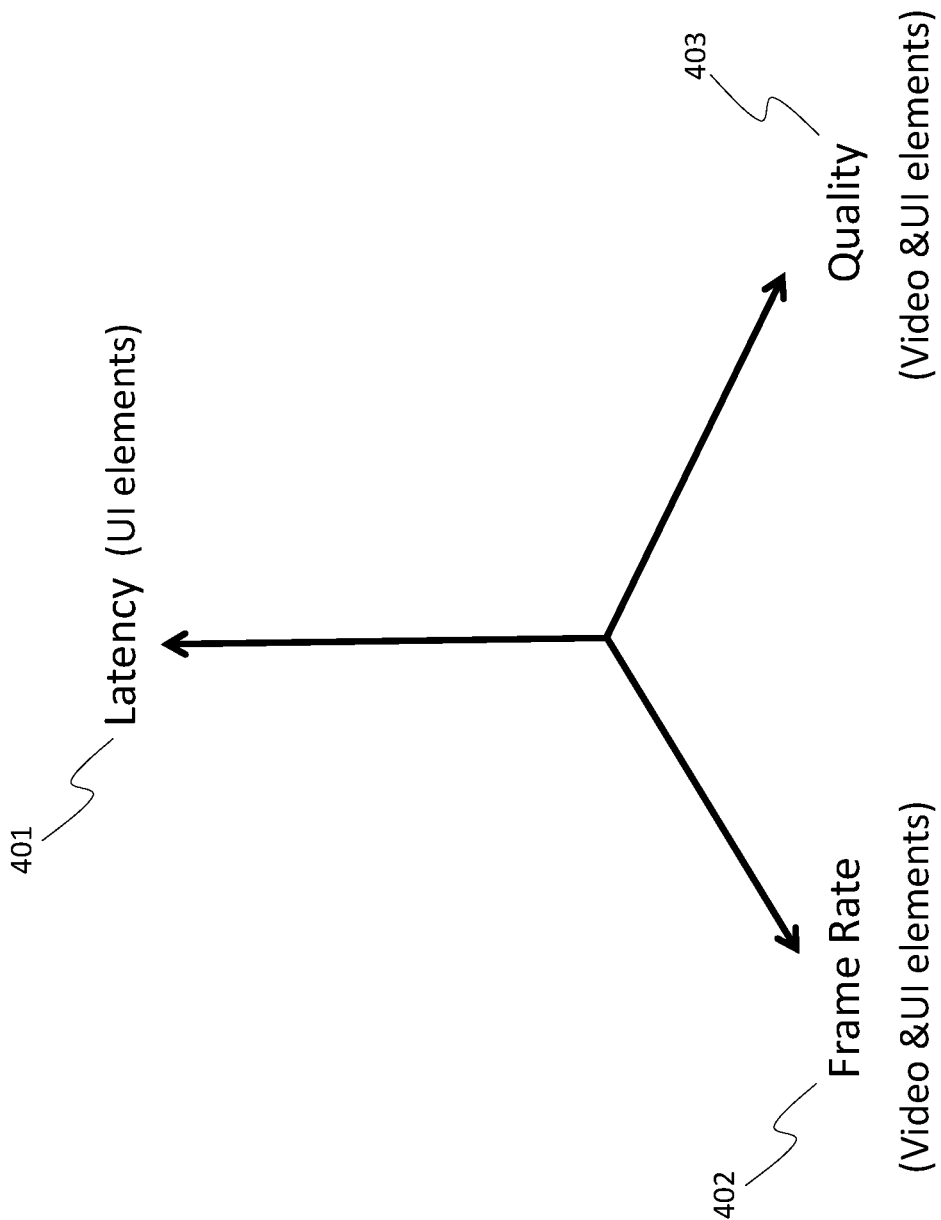
FIG. 4A is a multi-dimensional control graph showing decision paths for multiplexing audio, video and graphical user interface (UI) elements, according to some embodiments. Each dimension indicates which components of the user experience can contribute bandwidth for use by other components while minimizing the perceptual degradation of the composite user front-of-screen experience.

FIG. 4A is a multi-dimensional control graph showing decision paths for multiplexing audio, video and graphical user interface (UI) elements, according to some embodiments. Each dimension indicates which components of the user experience can contribute bandwidth for use by other components while minimizing the perceptual degradation of the composite user front-of-screen experience. FIG. 4A thus is a diagrammatic representation of three-dimensional decision logic used in class-based intelligent multiplexing in accordance with some embodiments. The three dimensions are latency 401, frame rate 402, and quality 403. The three dimensional decision logic thus may adjust (i.e., trade off) frame size versus frame rate (latency) versus frame quality (quantization). In some embodiments the control logic of the multiplexer makes decisions based on trading-off frame size for frame rate, which affects latency, or further trades image quality for either of, or a combination of, frame size and frame quality. In some embodiments, this trading off of variables is performed regardless of (i.e., independently of) whether the multiplex ensemble is approaching overflow. A diagrammatic representation of this decision logic may be seen in FIG. 4A showing the multidimensional control logic trading off Latency 401, Frame Rate 402, and Quality 403.

Figure 4B:
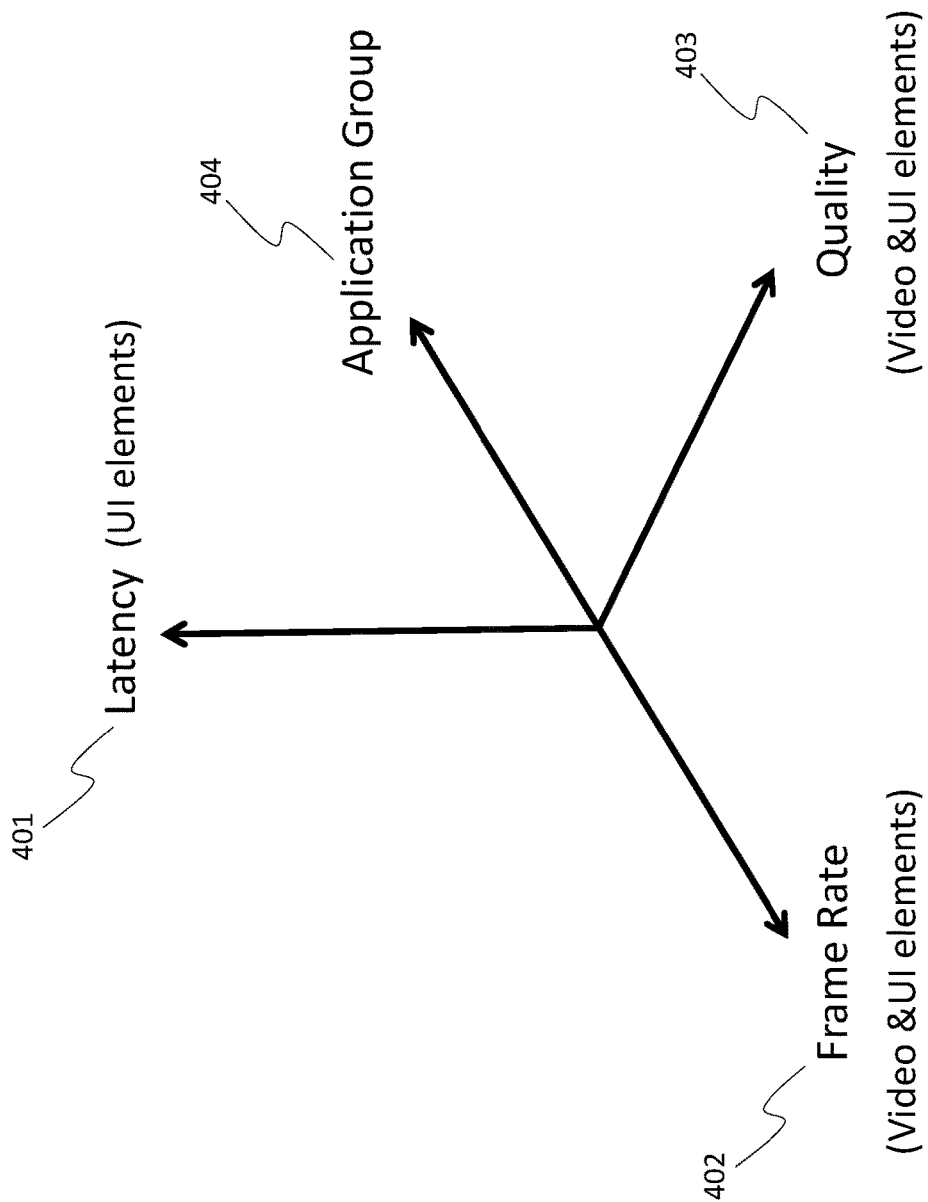
FIG. 4B is a multi-dimensional control graph showing decision paths as in FIG. 4A above with the additional decision dimension of whole application groups, in accordance with some embodiments.

FIG. 4B is a multi-dimensional control graph showing decision paths as in FIG. 4A above with the additional decision dimension of whole application groups. Class-based intelligent multiplexing thus may use four-dimensional decision logic in accordance with some embodiments; the four dimensions are latency 401, frame rate 402, quality 403, and application group 404.

The functionality described herein may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for prioritizing content classes in multiplexed content streams, comprising:
at a server system:
assigning a group of user sessions to a single modulator, wherein the user sessions comprise data in a plurality of classes, each class having a respective priority, wherein the plurality of classes includes, in order of priority from highest priority to lowest priority, audio data, video data, and user-interface graphical elements;
determining that an aggregate bandwidth for a first frame time exceeds a specified budget for the modulator; and
in response to determining that the aggregate bandwidth for the first frame time exceeds the specified budget:
allocating a first portion of the data for a first user session in the group of user sessions and allocating a second portion of the data for a second user session in the group of user sessions, where both the first portion and the second portion are allocated in accordance with the class priorities; and
transmitting the allocated portions of the data for the group of user sessions through the modulator during the first frame time.

2. The method of claim 1, further comprising:
in response to determining that the aggregate bandwidth for the first frame time exceeds the specified budget, allocating bandwidth for the group of user sessions during the first frame time in accordance with the class priorities; and
using the modulator, multiplexing the group of user sessions onto the channel corresponding to the modulator, in accordance with the allocated bandwidth;
wherein transmitting the allocated portion of the data for the group of user sessions comprises transmitting the multiplexed group of user sessions over a managed network.

3. The method of claim 2, wherein the plurality of classes further includes transport control information and error-correction information, wherein the transport control information has a higher priority than the audio data and the error-correction information has a lower priority than the user-interface graphical elements.

4. The method of claim 3, wherein allocating the bandwidth comprises:
providing bandwidth for all transport control information in the group of user sessions for the first frame time; and
dropping packets containing error-correction information for one or more user sessions of the group of user sessions.

5. The method of claim 4, wherein allocating the bandwidth comprises dropping all packets containing error-correction information for the group of user sessions during the first frame time.

6. The method of claim 5, wherein allocating the bandwidth further comprises:
after dropping all packets containing error-correction information, determining that the aggregate bandwidth for the first frame time still exceeds the specified budget; and
in response to determining that the aggregate bandwidth for the first frame time still exceeds the specified budget, reducing the size of one or more user sessions in the group of user sessions until the aggregate bandwidth for the first frame time does not exceed the specified budget,
wherein reducing the size of the one or more user sessions is performed in accordance with the class priorities.

7. The method of claim 6, wherein reducing the size of the one or more user sessions comprises, for a respective user session of the group of user sessions:
determining that an importance of a user-interface graphical element satisfies a criterion; and
in response to determining that the importance of the user-interface graphical element satisfies the criterion, allocating bandwidth to the user-interface graphical element.

8. The method of claim 6, wherein reducing the size of the one or more user sessions comprises, for a respective user session of the group of user sessions:
determining that an importance of a user-interface graphical element does not satisfy a criterion; and
in response to determining that the importance of the user-interface graphical element does not satisfy the criterion, delaying the user-interface graphical element until a second frame time subsequent to the first frame time.

9. The method of claim 6, wherein reducing the size of the one or more user sessions comprises, for a respective user session of the group of user sessions:
determining that a count of previously dropped video frames does not satisfy a threshold; and
in response to determining that the count of previously dropped video frames does not satisfy the threshold, dropping a video frame.

10. The method of claim 6, wherein reducing the size of the one or more user sessions comprises, for a respective user session of the group of user sessions:
determining that a count of previously dropped video frames satisfies a threshold; and
in response to determining that the count of previously dropped video frames satisfies the threshold, increasing a quantization level of a video frame to reduce the quality of the video frame.

11. The method of claim 6, wherein reducing the size of the one or more user sessions comprises, for a respective user session of the group of user sessions:
  in response to a determination that all possible size reductions for video data and user-interface graphical elements have been achieved or that size reductions for video data and user-interface graphical elements cannot be achieved, sending audio data for the first frame time in an earlier frame time that precedes the first frame time.

12. The method of claim 6, wherein reducing the size of the one or more user sessions comprises, for a respective user session of the group of user sessions:
  in response to a determination that all possible size reductions for video data and user-interface graphical elements have been achieved or that size reductions for video data and user-interface graphical elements cannot be achieved, dropping packets containing audio data and issuing an overflow alarm.

13. The method of claim 1, wherein transmitting the allocated portion of the data comprises:
  transmitting all audio data in the group of user sessions;
  delaying packets containing data for a user-interface graphical element until a second frame time subsequent to the first frame time; and
  using bandwidth freed by delaying the packets containing data for the user-interface graphical element to transmit video data.

14. The method of claim 1, wherein transmitting the allocated portion of the data comprises:
  transmitting all audio data in the group of user sessions;
  reducing a frame rate for a user-interface graphical element; and
  using bandwidth freed by reducing the frame rate for the user-interface graphical element to transmit video data.

15. The method of claim 1, further comprising, at the server system, altering the class priorities in real time, the altering comprising prioritizing a user-interface graphical element higher than video data for a video frame;
  wherein transmitting the allocated portion of the data comprises:
    transmitting all audio data in the group of user sessions;
    dropping the video frame; and
    using bandwidth freed by dropping the video frame to transmit the user-interface graphical element.

16. The method of claim 15, wherein prioritizing the user-interface graphical element higher than the video data for the video frame, dropping the video frame, and using the bandwidth freed by dropping the video frame to transmit the user-interface graphical element are performed in response to the user-interface graphical element containing a user-interface update generated based on user input.

17. The method of claim 1, wherein transmitting the allocated portion of the data comprises:
  transmitting all audio data in the group of user sessions;
  reducing the quality of an update for a user-interface graphical element; and
  using bandwidth freed by reducing the quality of the update for the user-interface graphical element to transmit video data.

18. The method of claim 1, wherein assigning the group of user sessions to the single modulator comprises:
  allocating bandwidth headroom to the channel corresponding to the modulator;
  adding successive user sessions for client devices in a client service area served by the modulator to the group of user sessions until the group is full;
  for each successive user session added to the group of user sessions, allocating a base amount of bandwidth to the channel; and
  as each successive user session is added to the group of user sessions, reducing the bandwidth headroom.

19. A server system, comprising:
one or more processors; and
memory storing one or more programs configured to be executed by the one or more processors, the one or more programs including instructions for:
  assigning a group of user sessions to a single modulator, wherein the user sessions comprise data in a plurality of classes, each class having a respective priority, wherein the plurality of classes includes, in order of priority from highest priority to lowest priority, audio data, video data, and user-interface graphical elements;
  determining that an aggregate bandwidth for a first frame time exceeds a specified budget for the modulator; and
  in response to determining that the aggregate bandwidth for the first frame time exceeds the specified budget:
    allocating a first portion of the data for a first user session in the group of user sessions and allocating a second portion of the data for a second user session in the group of user sessions, where both the first portion and the second portion are allocated in accordance with the class priorities; and
    transmitting the allocated portions of the data for the group of user sessions through the modulator during the first frame time.

20. A non-transitory computer-readable storage medium storing one or more programs configured for execution by one or more processors of a server system, the one or more programs comprising instructions for:
  assigning a group of user sessions to a single modulator, wherein the user sessions comprise data in a plurality of classes, each class having a respective priority, wherein the plurality of classes includes, in order of priority from highest priority to lowest priority, audio data, video data, and user-interface graphical elements;
  determining that an aggregate bandwidth for a first frame time exceeds a specified budget for the modulator; and
  in response to determining that the aggregate bandwidth for the first frame time exceeds the specified budget:
    allocating a first portion of the data for a first user session in the group of user sessions and allocating a second portion of the data for a second user session in the group of user sessions, where both the first portion and the second portion are allocated in accordance with the class priorities; and
    transmitting the allocated portions of the data for the group of user sessions through the modulator during the first frame time.

* * * * *